United States Patent [19]

Imamura et al.

[11] Patent Number: 5,003,423
[45] Date of Patent: Mar. 26, 1991

[54] VERTICAL RECORDING MAGNETIC HEAD

[75] Inventors: Tatsuo Imamura, Hachioji; Hiroyuki Yoshimori, Kanagawa; Yoshio Fukuda, Hino; Hiroyuki Abe, Hachioji; Hiroyuki Watanabe, Kanagawa; Makoto Koike, Toyota, all of Japan

[73] Assignee: Olympus Optical Company Ltd., Japan

[21] Appl. No.: 327,258

[22] Filed: Mar. 22, 1989

Related U.S. Application Data

[63] Continuation of Ser. No. 890,845, Aug. 27, 1986, abandoned.

[30] Foreign Application Priority Data

| Dec. 3, 1984 | [JP] | Japan | 59-255458 |
| Oct. 31, 1985 | [JP] | Japan | 60-245002 |
| Oct. 31, 1985 | [JP] | Japan | 60-245003 |
| Nov. 9, 1985 | [JP] | Japan | 60-251153 |
| Nov. 9, 1985 | [JP] | Japan | 60-251154 |
| Nov. 9, 1985 | [JP] | Japan | 60-251155 |
| Nov. 9, 1985 | [JP] | Japan | 60-251156 |
| Nov. 11, 1985 | [JP] | Japan | 60-252537 |
| Nov. 11, 1985 | [JP] | Japan | 60-252538 |
| Nov. 11, 1985 | [JP] | Japan | 60-252539 |
| Nov. 11, 1985 | [JP] | Japan | 60-252540 |
| Nov. 11, 1985 | [JP] | Japan | 60-252541 |
| Nov. 11, 1985 | [JP] | Japan | 60-252542 |
| Nov. 12, 1985 | [JP] | Japan | 60-251925 |
| Nov. 12, 1985 | [JP] | Japan | 60-251926 |

[51] Int. Cl.$^5$ .................. G11B 5/127; G11B 5/11; G11B 15/60
[52] U.S. Cl. .................. 360/125; 360/110; 360/128; 360/129; 360/130.3
[58] Field of Search ... 360/125, 130.3, 130.31–130.34, 360/129, 102, 103, 110, 122, 130.2–130.22, 128

[56] References Cited

U.S. PATENT DOCUMENTS

| 4,374,403 | 2/1983 | Oshima et al. | 360/113 |
| 4,649,448 | 3/1987 | Nakajima | 360/103 |
| 4,677,512 | 6/1987 | Akiyama et al. | 360/110 |
| 4,745,509 | 5/1988 | Watanabe et al. | 360/110 |

FOREIGN PATENT DOCUMENTS

| 54-47619 | 4/1979 | Japan . | |
| 57-205810 | 12/1982 | Japan . | |
| 58-17519 | 2/1983 | Japan . | |
| 59-19213 | 1/1984 | Japan . | |
| 59-90212 | 5/1984 | Japan . | |
| 59-90213 | 5/1984 | Japan . | |
| 59-90214 | 5/1984 | Japan . | |
| 59-90215 | 5/1984 | Japan . | |
| 59-215073 | 12/1984 | Japan | 360/130.3 |
| 60-98513 | 6/1985 | Japan . | |
| 60-202507 | 10/1985 | Japan . | |

Primary Examiner—John H. Wolff
Attorney, Agent, or Firm—Louis Weinstein

[57] ABSTRACT

A vertical recording magnetic head is disposed for movement close to or into sliding contact with a vertical recorded magnetic medium for purpose of magnetic recording and playback. To prevent the influences of external magnetic field upon a recording or reproduced magnetic field, a main magnetic pole of the head is surrounded by a block of a magnetizable material which exhibits a high permeability, which serves as a magnetic shield.

20 Claims, 21 Drawing Sheets

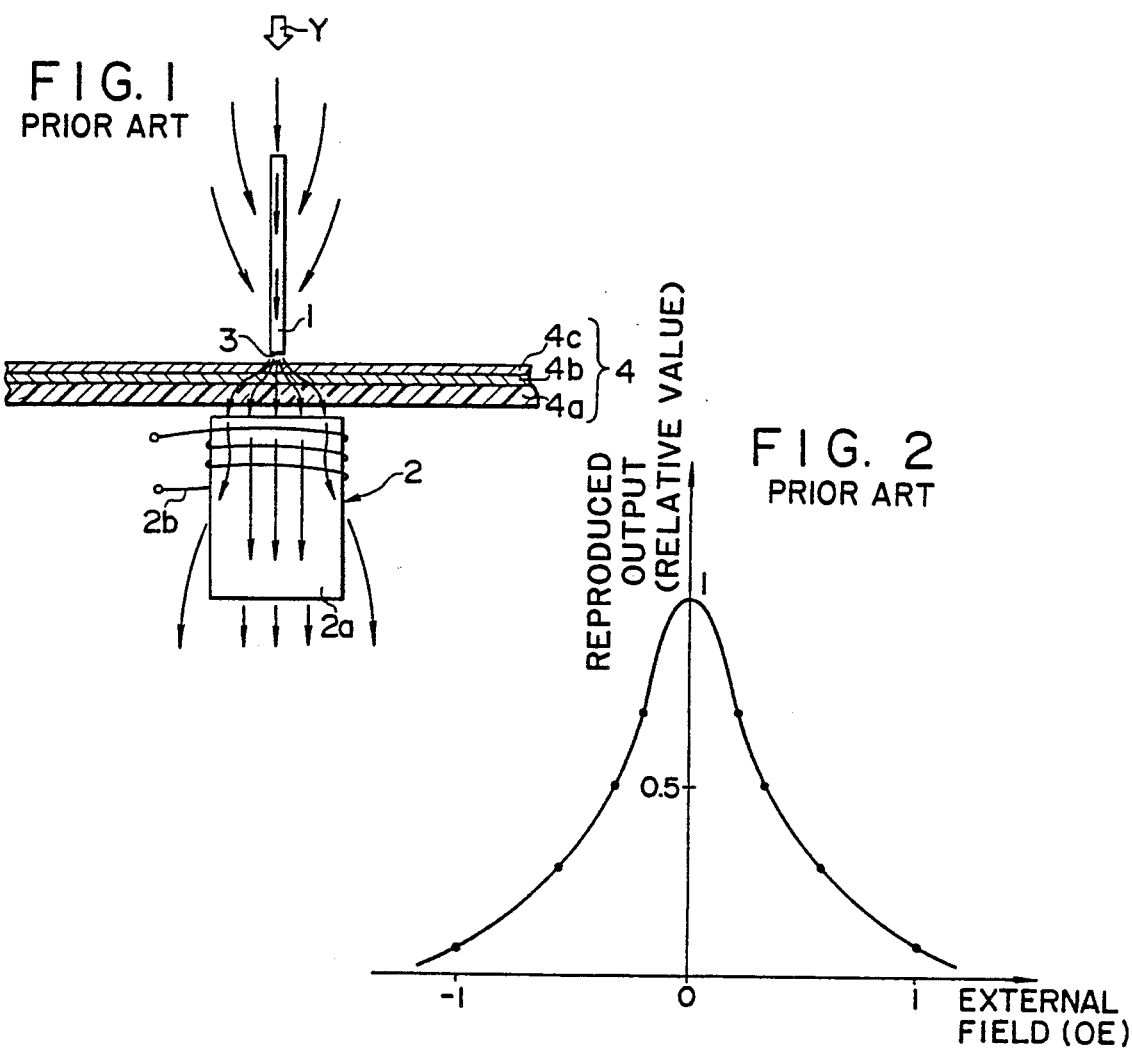
FIG. 1 PRIOR ART
FIG. 2 PRIOR ART
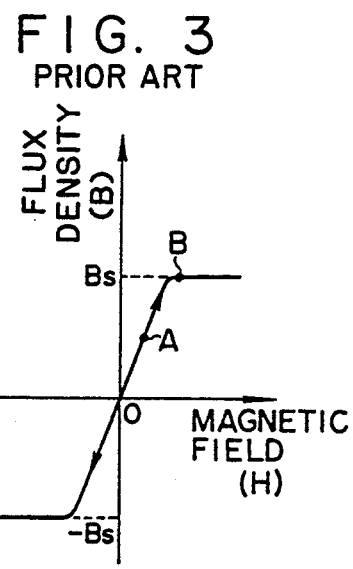
FIG. 3 PRIOR ART
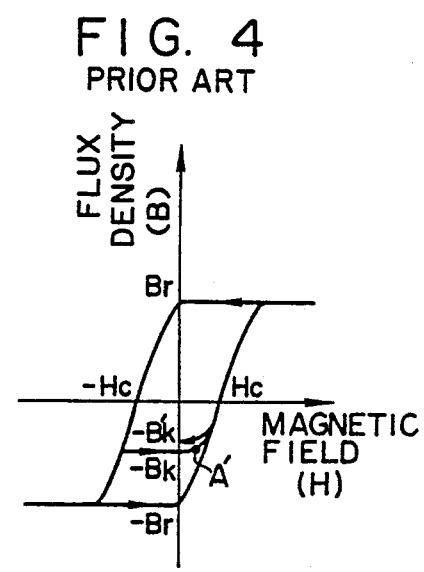
FIG. 4 PRIOR ART

VERTICAL RECORDING MAGNETIC HEAD

This is a continuation of application Ser. No. 890,845, filed Aug. 27, 1986, now abandoned.

TECHNICAL FIELD

The invention relates to a vertical recording magnetic head, and more particularly, to a vertical recording magnetic head (single pole magnetic head) which is designed so that a recording/playback output level is not influenced by an external magnetic field.

BACKGROUND TECHNOLOGY

It is known that a vertical magnetic recording system in which a magnetic record medium is magnetized in the direction of its thickness lends itself to high density recording since the smaller the wavelength of magnetization which is magnetically recorded (or the higher the frequency), the smaller in principle is the self-demagnetizing field within the magnetic record medium.

To perform such a vertical magnetic recording, it is necessary to provide a magnetic record medium which exhibits an increased vertical magnetic anisotropy and a magnetic record head which products a sharply defined, strong vertical magnetic field component. The vertical magnetic recording system can be categorized into an auxiliary pole excited type and a main pole excited type.

In a vertical magnetic head system of an auxiliary pole excited type, a main pole 1 (see FIG. 1) comprising a high permeability magnetic thin film as may be formed by Co-Zr-Nb is disposed in opposing relationship with an auxiliary pole 2 comprising a high permeability magnetizable block 2a such as may be formed by ferrite around which a winding 2b is disposed for passing an electric current representing an information signal, with a given air gap 3 interposed therebetween, as shown in FIG. 1. When magnetically recording or reproducing on or from a magnetic record medium 4, the medium 4 is passed through the air gap 3 in a manner such that the magnetizable film of the medium 4 is in sliding contact with the main pole film 1. The medium 4 comprises a flexible base 4a which may be formed by a high polymer film on which a high permeability magnetic layer 4b as may be formed by Fe-Ni, permalloy or the like is formed, which is in turn overlaid with a vertical recording magnetic layer 4c which exhibits a preferred axis of magnetization perpendicular to tho surface of the medium.

Describing the operation of the vertical recording magnetic head of auxiliary pole excited type as mentioned above, an information signal which is delivered from a signal generator, not shown, is applied to the winding 2b, whereupon a magnetic field is produced by the auxiliary pole 2, and this magnetic field acts on the main pole 1 to cause a sharply defined magnetic field to be produced around the tip of the main pole 1. The sharply defined magnetic field is effective to record a magnetic version of the information to be recorded in the medium 4. In the vertical recording magnetic head system of auxiliary pole excited type, the flow of magnetic flux follows an open magnetic path, and thus the sharply defined magnetic field passes through a magnetic path including the main pole 1→magnetic record medium 4→auxiliary pole 2, for example, and the passes through the air space to return to the magnetic pole 1.

It will be understood that the open magnetic path as mentioned above is likely to be influenced by external fields such as that developed by a motor which is used to drive the medium 4 or earth magnetism (which is said to be of the order of 0.3 to 0.4 Oersted in Japan). Thus, assuming that such an external magnetic field is applied to the medium 4 in a direction perpendicular thereto, as indicated by a solid arrow Y shown in FIG. 1, the magnetic field which extends through the main pole 1, the medium 4 and the auxiliary pole 2 will be as indicated by arrows in thin lines. Accordingly, when an external magnetic field of an increased strength as mentioned above is applied when a magnetic recording of a series of information signals has been completed and such signal is then being reproduced, the output level of the reproduced signal will diminish due to the magnitude of the external magnetic field.

An actual measurement of such phenomenon is illustrated in FIG. 2. Specifically, in the vertical recording magnetic head of auxiliary pole excited type as illustrated in FIG. 1, a perpendicular external field of strengths having several different values is applied to the magnetic record medium. An output level which is reproduced in the absence of an external field is plotted as "1" on the ordinate while the external field, represented in Oersteds (Oe) is taken on the abscissa. As shown, when the external field has a magnitude equal to or greater than 1 Oe, the reproduced output level will be substantially reduced to zero.

In addition to causing a reduction in the reproduced output, the influence of an external field also results in a reduction in the recorded level or a diminishing effect upon the remnant magnetization of the medium in the absence of any record/playback operation and when a magnetic head is moved close to or in sliding contact with the medium which has previously been recorded. The occurrence of such influence of the external field is believed to occur for the following reason:

FIG. 3 graphically shows the B-H response of the main pole of a vertical recording magnetic head while FIG. 4 illustrates the B-H response of a record medium which is magnetized using a vertical recording magnetic head which exhibits the response as indicated in FIG. 3. In the absence of an external magnetic field, the main pole will be magnetized to a flux density corresponding to a saturation level ±Bs in both positive and negative directions or in opposite directions from an origin 0, varying with an alternating magnetic field produced by a record signal, in a manner as illustrated in FIG. 3. On the other hand, the record medium will be magnetized to a flux density corresponding to a saturation level in both positive and negative directions, by the magnetic field developed by the main pole which is magnetized in the manner mentioned above, as illustrated in FIG. 4, thus retaining a remnant flux ±Br. This represents a normal magnetic recording on the record medium. In the presence of an external magnetic field (in the positive direction which may be caused by the earth's magnetism or by a magnet of a d.c. motor), the magnetizing force or magnetic field which acts upon the main pole comprises an additive effect of the magnetic field produced by the recording signal and the external magnetic field. In other words, the magnetizing force will shift in the positive direction on the abscissa, as viewed in FIG. 3. As a consequence, the operating point for the magnetization (flux density) of the main pole will move to a point A shown in FIG. 3, with the consequence that while it may be magnetized to the saturation level Bs in the positive direction, it may not be magnetized to the saturation level −Bs in the negative direction. When the recording medium is magnetized by a magnetic field from a main magnetic pole having a biased magnetization, the remnant flux in the recording medium may retain +Br in the positive direction, but the remnant flux in the negative direction will be reduced to −Bk (see FIG. 4), which is smaller in magnitude than −Br. In other words, the external magnetic field has caused a reduction in the magnetic recording level.

When the vertical recording magnetic head is brought close to or in sliding contact with the recording medium having a biased magnetization as mentioned above, in a manner illustrated in FIG. 1, and when an external magnetic field of a magnitude which shifts the magnetization in the main pole to the point A shown in FIG. 3 is applied, the magnetizing force which results from the external field (principally concentrated on the main pole) causes a change of the magnetization in the recording medium from its initial remnant magnetization −Bk to a value corresponding to a point A' shown in FIG. 4. If the external field is removed subsequent to a change which has occurred in this manner, thus removing the magnetizing force from the main pole, the magnetization in the recording medium cannot be restored to its original remnant magnetization −Bk, but will revert to a value −Bk', which is smaller in magnitude (see FIG. 4). This is because there is an irreversible relationship between a magnetization (flux density) and a change in the magnetic field (magnetizing force) as is well recognized.

Thus, the remnant magnetization or magnetic recording level will diminish in response to the application of an external magnetic field to a recorded medium with or without subsequent removal of the external field. It will be readily appreciated that such tendency will be notable particularly when the main pole of the vertical recording magnetic head is brought close to or into sliding contact with the recording medium.

Assuming that a normal magnetic recording has been made on a medium it is then desired to reproduce recorded information from the medium in the presence of an external field, which is a d.c. field as mentioned previously. In this instance, the external field will be additive to a magnetic field which is produced by the recorded medium, so that the operating point for the main pole of the vertical recording magnetic head will move in the positive direction on the abscissa from the origin O to the point A, for example, or to a point B if the external field has a greater magnitude. It will be apparent from the B-H response curve shown in FIG. 3 that when the operation is centered about the point A or B, the rate of change in the magnetization or the flux density in the main pole which corresponds to a change in a magnetizing force, which now comprises the signal field from the medium added with the external field, will be greatly reduced, and will be substantially equal to zero in the event the operating point is shifted beyond the point B in the positive direction. In this manner, the sensitivity of reproduction will be degraded.

A reduction in the recording/reproducing level under the influence of an external magnetic field, and a reduction in the recorded level of the medium when a magnetic head is brought close to or into sliding contact with a recorded medium occur not only in the vertical recording magnetic head of auxiliary pole excited type, but also in the magnetic head of main pole excited type.

Thus, it is recognized that the vertical magnetic recording scheme is susceptible to the influence of at external magnetic field, to a greater degree than that which occurs in a conventional parallel-to-surface recording scheme.

While a shielding technique which prevents an electromagnetic interference (see, for example, M. Mogi "Remedies against Noises and Troubles in Electronic Circuits", published from CQ Shuppan-Sha) or a shielding technique which prevents the occurrence of electrostatic noise (see Laid-Open Patent Application No. 186,112/1984) are well known in the art, there is no established technology which overcomes the described problems inherent in vertical magnetic recording.

Accordingly, it is an object of the invention to provide a vertical recording magnetic head which prevents an influence of an external magnetic field, which would reduce the recording/reproduced output level or the recorded level of the medium when the magnetic head is brought close to or into sliding contact with the recorded medium.

DISCLOSURE OF THE INVENTION

To achieve the above object, the invention is characterized by applying a magnetic shield comprising a magnetizable material of a high magnetic permeability disposed in surrounding relationship with the main pole of a vertical recording magnetic head.

BRIEF DESCRIPTION OF THE DRAWINGS

FIG. 1 is a side elevation showing the construction of a conventional vertical recording magnetic head of auxiliary pole excited type;

FIG. 2 is a response curve which illustrates a change in the reproduced output level when an external field is applied to a conventional vertical recording magnetic head of auxiliary pole excited type as indicated in FIG. 1;

FIG. 3 is a graph showing the B-H response of the main pole of a vertical recording magnetic head;

FIG. 4 is a graph illustrating the B-H response of a record medium which is magnetized by a vertical recording magnetic head operating with the response as shown in FIG. 3;

BEST MODES OF CARRYING OUT THE INVENTION

Figure 5A:
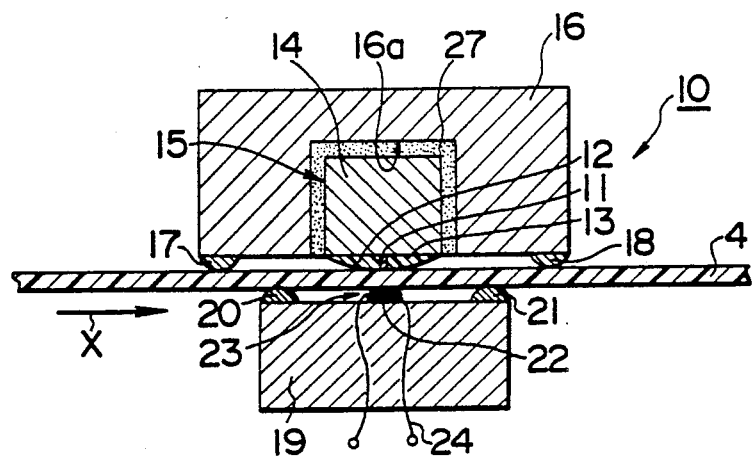
FIG. 5A to 5D are a cross section, exploded perspective views of a vertical recording magnetic head acccording to a first embodiment of the invention and a diagrammatic view illustrating paths for the magnetic field.
Figure 5B:
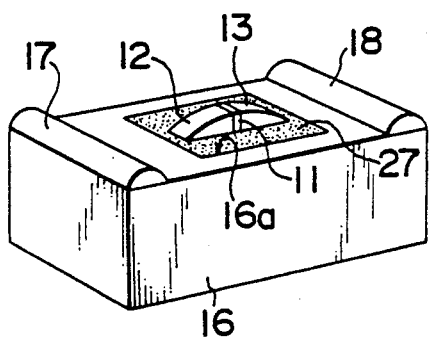
Figure 5C:
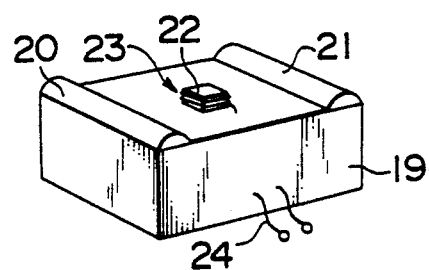

FIGS. 5A, 5B and 5C illustrate a first embodiment of the invention, as applied to a vertical recording magnetic head of auxiliary pole excited type. In the invention, it is also desirable that a magnetic record medium 4 which is entirely similar to that shown in FIG. 1 be used. Thus, as mentioned previously, the magnetic record medium 4 comprises the flexible base 4a which may be formed of a film of high polymer on which is formed a magnetizable layer 4b of high magnetic permeability as may be formed by Fe-Ni, permalloy or the like, which is overlaid with a vertical recording magnetic layer 4c having a preferred axis of magnetization which is directed perpendicular to the surface of the medium.

As shown in FIGS. 5A, 5B and 5C, the vertical recording magnetic head 10 of auxiliary pole excited type comprises a main pole block 15, a main pole shield block 16, an auxiliary pole shield block 19 and an auxiliary pole 23.

The main pole block 15 comprises a main pole film 11 which may be formed of an amorphous magnetic metal such as cobalt-zirconium-niobium, cobalt-zirconium-molybdenum, permalloy or Sendust, for example, and which is held sandwiched between a pair of laterally disposed main pole sandwich members 12, 13 which may be formed of a crystallized glass, non-magnetic ferrite or the like. A block 14 of a magnetizable material exhibiting a high magnetic permeability such as manganese-zinc-ferrite, nickel-zinc-ferrite or the like has its bottom surface cemented to the top of the main pole film 11 and the both sandwich members 12, 13. The lower surface of the main pole block 15 is polished to present an arcuate surface, in which the lower end face of the main pole film 11 is exposed.

The main pole shield block 16 is in the form of an inverted box having a recess 16a which is open toward its bottom and is formed of the same material as the block 14, namely, a magnetizable material exhibiting a high magnetic permeability. The block 16 is disposed in surrounding relationship with the entire main pole block 15. A non-magnetic adhesive 27 such as epoxy resin, water glass or the like fills in a clearance region defined between the blocks 16 and 14. A pair of semi-cylindrical pads 17, 18, which are formed of a lubricating material such as vitreous carbon, are cemented to the lower end face of the shield block 16 toward its outer ends, and these pads 17, 18 are disposed so as to be coplanar with the lower end face of the main pole film 11.

The auxiliary pole shield block 19 is formed of the same material as the magnetizable material of the block 14 thus exhibiting a high magnetic permeability, and is in the form of a slab-shaped member having a lateral width which is on the order of approximately two-thirds that of the main pole shield block 16. The auxiliary pole 23 comprises a body 22 in the form of a polygonal pillar of a reduced length which is disposed centrally on the top surface of the shield block 16 so as to be located opposite to the lower end face of the main pole film 11, and is formed of a ferrite or the like. Additionally, the auxiliary pole 23 comprises a winding 24 disposed around the body 22 for passing and delivering a signal. A pair of semi-cylindrical pads 20, 21, formed of the same material as the pads 17, 8 are cemented to the upper surface of the shield block 19 toward its opposite lateral ends.

It will be appreciated that the surface of the auxiliary pole shield block 19 which carries the auxiliary pole 23 thereon is disposed in opposing relationship with the surface of the main pole block 15 carrying the main pole film 11 as well as the bottom surface of the main pole shield block 16 with a suitable air gap therebetween. The air gap is narrow enough to present an increased resistance to any external magnetic field which tends to find its way into the gap. The magnetic recording medium 4 runs in the direction indicated by an arrow X in sliding contact with the main pole film 11 while its opposite surfaces are maintained in abutting relationship with the pads 17, 18 and the pads 20, 21.

Figure 5D:
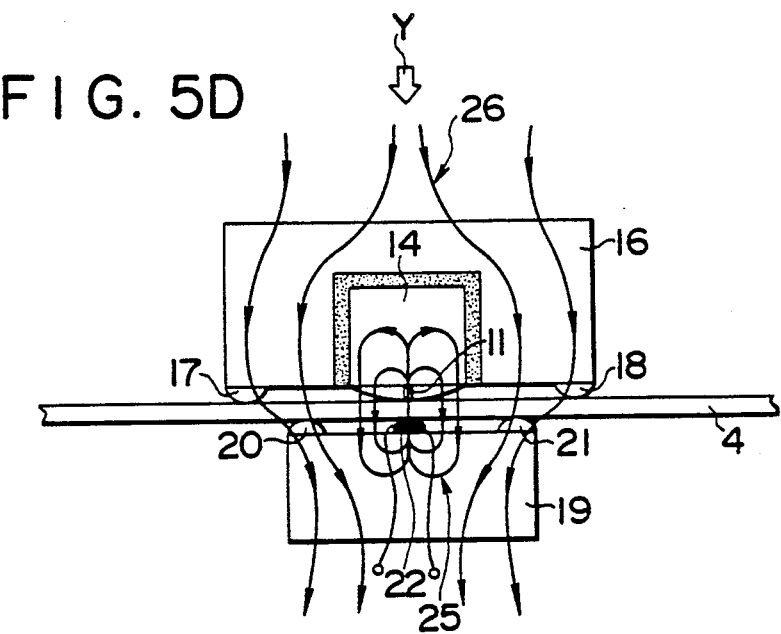

When a magnetic recording operation is performed with the magnetic head 10 constructed in the manner mentioned above, a magnetic field produced by the cooperation of the auxiliary magnetic pole 23 and the main pole film 11 is configured as a pair of oblong ellipses 25 disposed side by side, as indicated in FIG. 5D. If an external field, indicated by a solid arrow Y, is applied perpendicular to the record medium 4 during or after the magnetic recording process, the external field will proceed downward through the main pole shield block 16 along separate branches indicated by arrows 26, and then passes through the record medium 4 to enter the auxiliary pole shield block 19, the bottom surface of which is effective to release it into the air. In other words, the internal magnetic field indicated by numeral 25 is completely separated from the external magnetic field indicated by numeral 26, preventing any influence of the external field upon the internal field or recorded field. In this manner, a reduction in the recording/reproduced level attributable to the presence of an external magnetic field as well as a reduction in the recording level in the medium when the magnetic head is brought close to or into sliding contact with the recorded medium can be effectively avoided.

The shielding effect can be further enhanced by forming the pads 17, 18, 20 and 21 from a soft magnetic material.

Figure 6A:
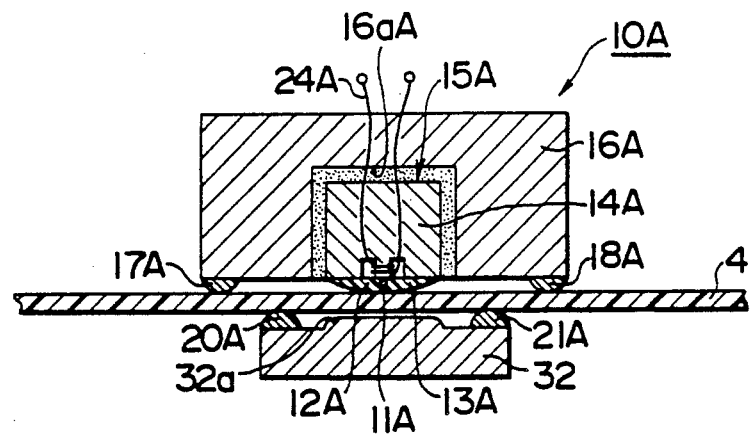
FIGS. 6A to 6D are a cross section, exploded perspective views of a vertical recording magnetic head according to a second embodiment of the invention and a diagrammatic view showing paths for the magnetic field.
Figure 6B:
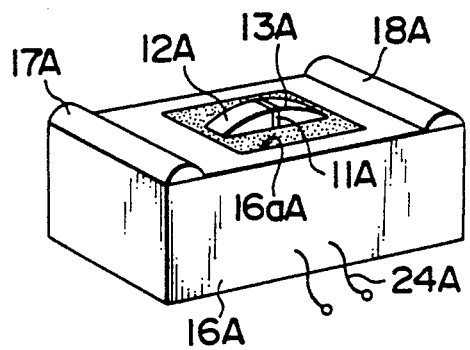
Figure 6C:
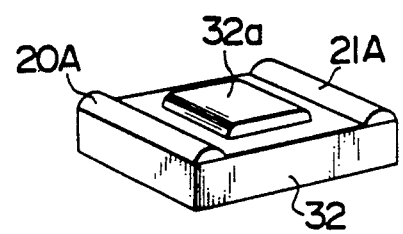

FIGS. 6A, 6B and 6C show a second embodiment of the invention, which is applied to a vertical recording magnetic head of main pole excited type. In the description to follow, it should be understood that components or parts which are identical or equivalent in function are designate by like numerals as used above, followed by alphabetical capital letters "A", "B", "C", and so on, without repeating the description of what has been mentioned previously.

As shown in FIGS. 6A, 6B and 6C, a vertical recording magnetic head 10A of main pole excited type comprises a main pole block 15A, a main pole shield block 16A and a pad mounting shield block 32. The main pole block 15A comprises a block 14A of a magnetizable material, a main pole film 11A and a pair of main pole sandwich members 12A, 13A. Specifically, the block 14A is in the form of a parallelpiped of a magnetizable material exhibiting a high magnetic permeability such as ferrite and which is centrally formed with a recess in its bottom surface, as viewed in FIG. 6A, with a projection disposed substantially centrally in the recess and carrying a winding 24A. The upper end face of the main pole film 11A is cemented to the projection, and the main pole film 11A is held between the pair of main pole sandwich members 12A, 13A, the upper end faces of which are cemented to the bottom surface of the block 14A.

The main pole shield block 16A is disposed in surrounding relationship with the main pole block 15A, and a pair of semi-cylindrical pads 17A, 18A are cemented to the lower end face of both limbs of the shield block 16A, toward their outer ends.

The pad mounting shield block 32 is disposed below the main pole block 15A, and is in the form of a parallelpiped which is formed of the same magnetizable material exhibiting a high magnetic permeability as that used to form the block 14 (see FIG. 5A). The shield block 32 is centrally formed with a raised portion 32a so as to be coextensive with the block 14A. A pair of semi-cylindrical pads 20A, 21A are cemented to the upper surface of the shield block 32 toward its opposite ends.

The upper surface of the shield block 32 having the raised portion 32a is disposed opposite to and spaced by a given air gap from the entire lower surface including the lower end faces of the main pole block 15A and the main pole shield block 16A. The magnetic record medium 4 runs through the air gap in sliding contact with the main pole film 11 while its opposite surfaces are maintained in abutting relationship with the pads 17A, 18A and the pads 20A, 21A. The provision of the raised portion 32a enables a reduction in the reluctance, thus improving the efficiency of the magnetic head.

Figure 6D:
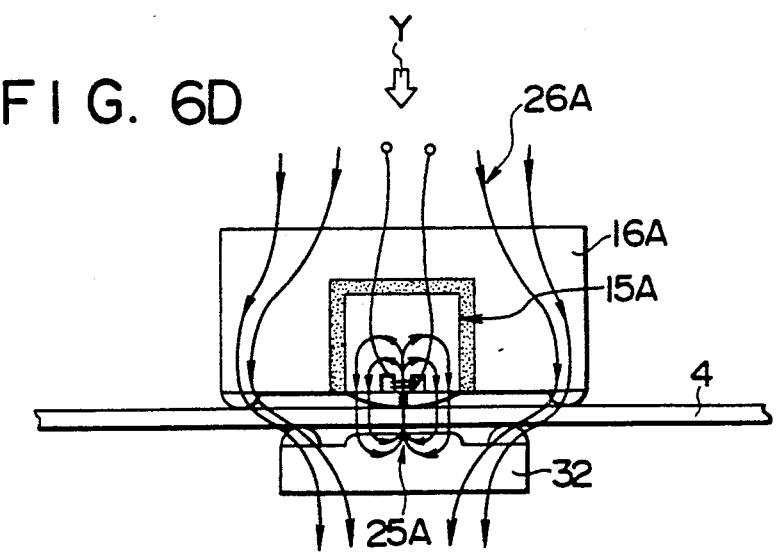

When a magnetic recording or playback operation is performed using the magnetic head 10A, the magnetic path 25A which is effectively used in the recording and playback is completely separated from an external field 26A, if an external field is present as indicated by a solid arrow Y, in a manner shown in FIG. 6D, whereby the described problems which are attributable to the presence of an external magnetic field can be effectively avoided.

Figure 7A:
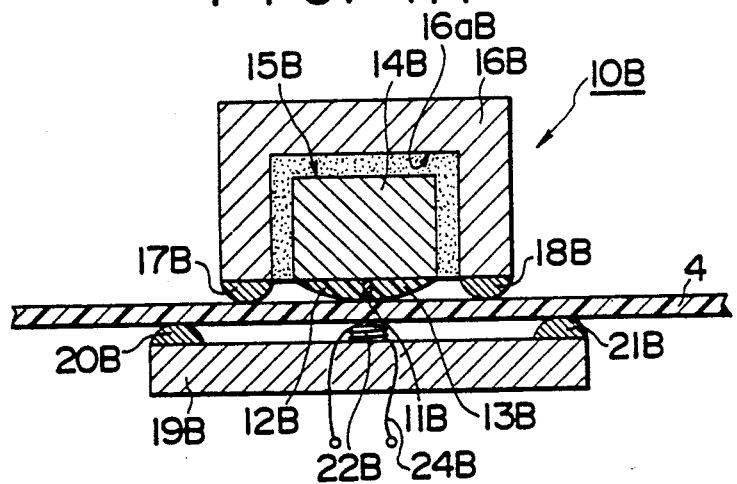
FIGS. 7A to 7C are a cross section and exploded perspective views of a vertical recording magnetic head according a third embodiment of the invention.
Figure 7B:
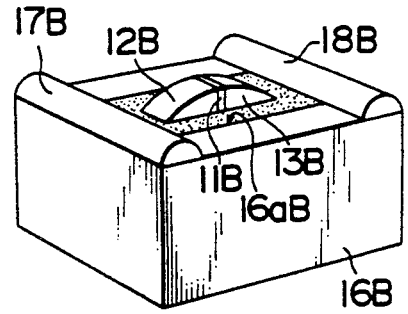
Figure 7C:
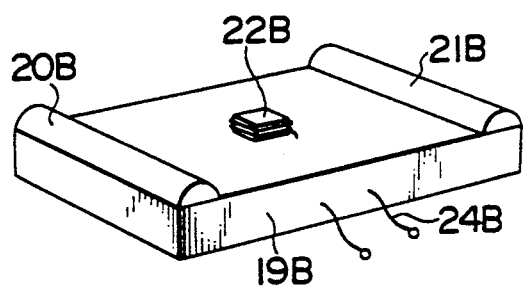

FIGS. 7A, 7B and 7C show a vertical recording magnetic head 10B of auxiliary pole excited type, which represents a modification of the first embodiment. In this head 10B a spacing between pads 17B and 18B which are cemented to the main shield block 16B is reduced as compared to the spacing used in the first embodiment shown in FIG. 5A while a spacing between pads 20B and 21B which are cemented to the auxiliary pole shield block 19B is greater than that used in the first embodiment. If the spacing between either upper or lower pads is changed, the recording or reproduced magnetic field is completely separated from an external magnetic field as before, again avoiding the problems attributable to the presence of an external magnetic field. A change in the spacing between the pads enables the choice of a suitable pressure between the record medium 4 and the main pole film 11 as a sliding contact occurs therebetween, thus allowing an optimum contact with respect to the tip of the main pole to be achieved.

Figure 8A:
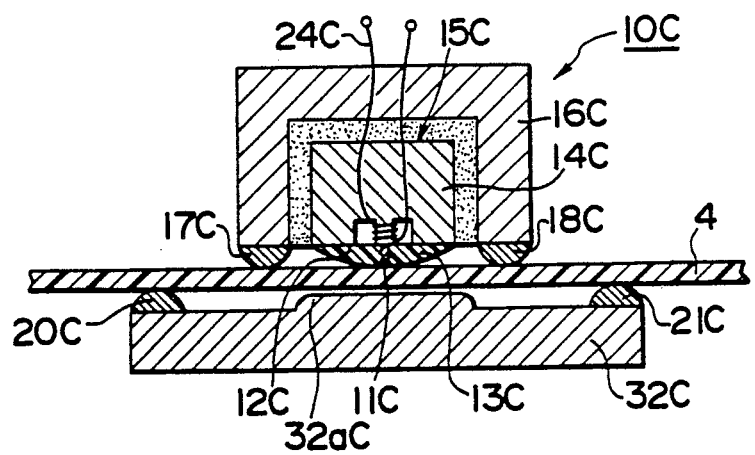
FIGS. 8A to 8C are a cross section and exploded perspective views of a vertical recording magnetic head according to a fourth embodiment of the invention.
Figure 8B:
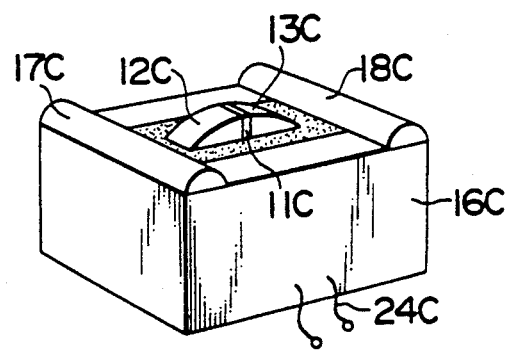
Figure 8C:
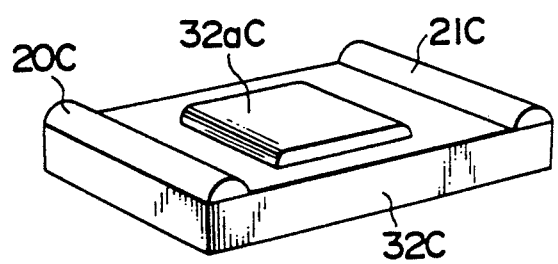

FIGS. 8A, 8B and 8C show a vertical recording magnetic head 10C of main pole excited type, which represents a modification of the second embodiment. As in the modification shown in FIGS. 7A to 7C relative to the first embodiment, the spacing between the pads 17C and 18C on the main pole shield block 16C as well as the spacing between pads 20C and 21C on the pad mounting shield block 32C which includes a raised portion 32aC is changed for the reasons mentioned previously.

In the embodiments described above, all of the pads, for examples, the pads 17, 18, 20 and 21 used in the vertical recording magnetic head 10 shown in FIG. 5A, extend linearly in a direction orthogonal to the running direction of the magnetic medium 4. Thus, the pads 17 and 18 on the main pole shield block 16, as well as the pads 20 and 21 on the auxiliary shield block 19 are disposed upstream and downstream, respectively, as viewed in the direction of running X of the recording medium 4, of the lower surface of the main pole block 15 which presents a surface for sliding contact with the medium, and are elongate in a direction orthogonal to the direction X. For this reason, powder of magnetizable material which is abraded off the magnetic recording medium 4 or dust suspended in the air tend to be accumulated on the upstream pads 17 and 20, and if they are allowed to flow downstream, they will pass the sliding surface of the main pole block 15 to cause the ingress of dust into the clearance between the sliding surface and the recording medium 4.

In addition, it will be understood that the pads 17 to 21 operate to press against the magnetic recording medium 4 over an extensive area in the direction of the track width at locations upstream and downstream of the sliding surface on the main pole block 15, thus causing an increase in the resistance presented to the running of the recording medium 4 and also tending to cause a reduction in the pressure of contact of the recording medium 4 against the sliding surface, accompanying the likelihood that a uniform pressure of contact may not be achieved over the entire track width.

Figure 9A:
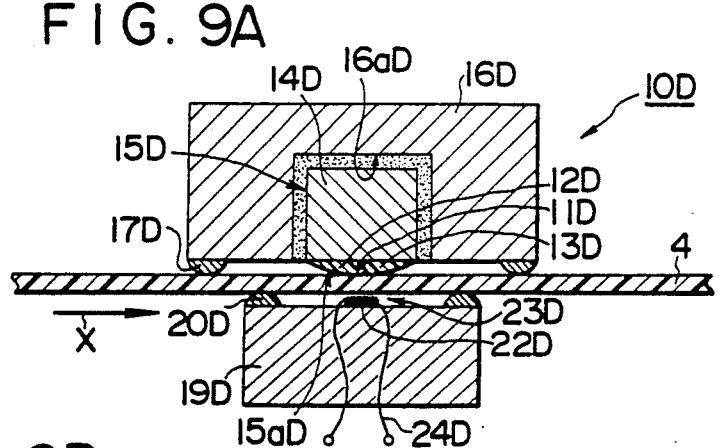
FIGS. 9A to 9D are a cross section and exploded perspective views of a vertical recording magnetic head according to a fifth embodiment of the invention and a plan view showing the disposition of a pad.
Figure 9B:
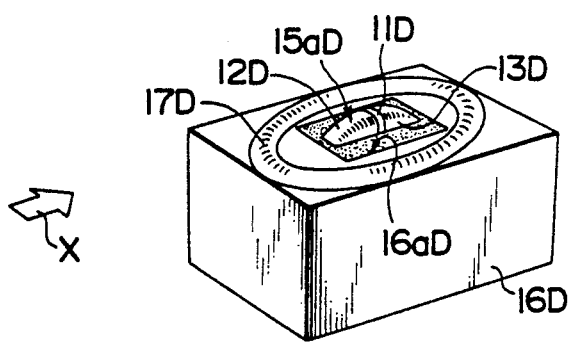
Figure 9C:
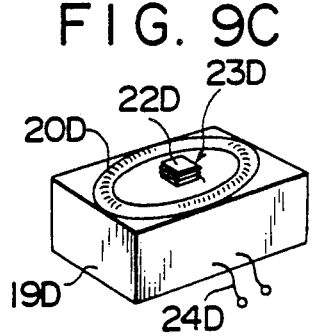

Accordingly, there is proposed a vertical recording magnetic head which assures a satisfactory contact of the record medium with the sliding surface on the main pole block and reducing the influence of dust while preventing a reduction in the recording/reproduced output level due to the presence of an external magnetic field. An embodiment of such a magnetic head is illustrated in FIGS. 9A, 9B and 9C. Specifically, a vertical recording magnetic head 10D is of the auxiliary pole excited type in the similar manner as the magnetic head 10 shown in FIGS. 5A to 5C, and comprises a main pole block 15D, a main pole shield block 16D, an auxiliary pole shield block 19D, an auxiliary pole 23D and pads 17D, 20D, generally in the similar manner as the head 10.

The main pole shield block 16D is formed of a magnetizable material exhibiting a high magnetic permeability in entirely the same manner as the main pole shield block 16 mentioned previously, with the main pole block 15D disposed in a recess 16aD formed therein. A non-magnetic adhesive fills a clearance region between the main pole block 15D and the main pole shield block 16D, whereby the block 14D is secured as embedded in the recess 16aD. The main pole sandwich members 12D, 13D and the main pole film 11D held therebetween, all of which are cemented to the lower surface of the block 14D, project from the end face defined by the opening of the recess 16aD in the main pole shield block 16D.

Figure 9D:
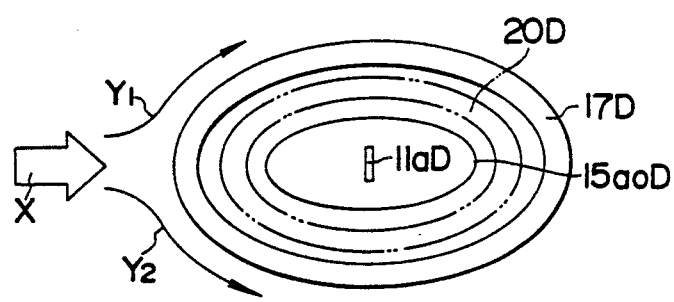

It will be seen from FIGS. 9A and 9B that the lower end of the main pole block 15D which projects from the opening of the recess 16aD is elongate in a direction parallel to the running direction X of the recording medium 4, as viewed in the plane thereof. More specifically considering a sliding surface 15aD thereon which is disposed opposite to the recording medium 4, it projects toward the recording medium 4 in an arcuate form with a selected curvature, as viewed in the running direction X while it is arcuately formed with a greater curvature, or with a reduced radius of curvature, in a direction orthogonal to the running direction X. Accordingly, when the sliding surface 15aD, which represents the lower end face of the main pole block 15D, is in sliding contact with the flexible recording medium 4, a substantially elliptical region $15a_0D$ of the sliding surface 15aD, which has a major axis in the running direction X and centered about the lower end face 11aD of the main pole film 11D will be actually in sliding contact with the recording medium 4 to impart such an elliptical deformation thereto, as indicated in FIG. 9D.

A substantially elliptical pad 17D is cemented to the lower end face of the main pole shield block 16D toward the edge thereof so as to surround the lower end of the main pole block 15D, as shown in FIG. 9B. The pad 17D comprises a lubricating material such as vitreous carbon, for example, and is semi-circular in cross section (see FIG. 9A). The major axis of the elliptical configuration of the pad 17D coincides with the running direction X of the recording medium 4. Accordingly, when the lower end face of the pad 17D is in sliding contact with the recording medium 4, the pad 17D will be in contact with the recording medium 4 in an elliptical configuration which surrounds the sliding region $15a_0D$, as indicated in FIG. 9D.

The auxiliary pole shield block 19D is located in opposing relationship with the main pole shield block 16D, which is assembled into an integral unit with the main pole block 15D in surrounding relationship therewith, with the record medium 4 interposed therebetween, and is formed of a magnetizable material exhibiting a high magnetic permeability as is the main pole shield block 16D. The auxiliary pole 23D comprises a body 22D, formed of a ferrite, for example, which is disposed on the upper surface of the auxiliary pole shield block 19D at a location opposite to the main pole film 11D, with a winding 24D disposed around the body 22D. A substantially elliptical pad 20D is cemented to the upper surface of the auxiliary pole shield block 19D toward its edge so as to surround the auxiliary pole 23D, as shown in FIG. 9C. The pad 20D comprises a lubricating material such as a vitreous carbon, for example, in a similar manner as the pad 17D. The pad 20D also is semi-circular in cross section (see FIG. 9A). The pad 20D has a major axis of its elliptical configuration which, coincides with the running direction X of the record medium 4. The upper end face of the pad 20D is slightly higher than the upper end face of the auxiliary pole 23D, and thus is in sliding contact with the lower surface of the record medium 4 which is not a recording surface. Accordingly, the pad 20D is in sliding contact with the recording medium 4 in an elliptical configuration, as located between the sliding region $15a_0D$ and the pad 17D, from the opposite side of the medium 4.

When a magnetic recording or playback operation is performed using the magnetic head 10D thus constructed, the magnetic recording medium 4 runs in a direction indicated by a solid arrow X through the space defined between the main pole shield block 16D and the auxiliary pole shield block 19D while being maintained in sliding contact with the sliding surface $15aD$ which is centered about the main pole film 11D and while its opposite surfaces are maintained in abutting relationship with the pads 17D and 20D. As the recording medium 4 runs in the direction of the arrow X, the pads 17D and 20D are in sliding contact therewith in elliptical regions which are oblong in the running direction X and centered about the actual sliding region $15a_0D$, thus reducing the resistance which the magnetic head 10D presents with respect to the running of the recording medium 4 while stabilizing the sliding contact therebetween. In addition, any dust which may be deposited upon the recording medium 4 is prevented from reaching the lower end face 11aD of the main pole film 11D which represents the center of the sliding contact region $15a_0D$, due to the presence of the pads 17D and 20D. In other words, the pads 17D and 20D are maintained in sliding contact with the recording medium 4 over an increase length in the running direction X and on the opposite sides of the sliding contact region $15a_0D$, as viewed in a direction orthogonal to the running direction X or in the direction of the track width. This reduces the resistance presented to the running of the recording medium while assuring a close contact of the recording medium 4 with the sliding contact surface 15aD of the main pole block 15D, or more particularly, to the elliptical sliding contact region $15a_0D$, thus enabling the main pole film 11D to be maintained in sliding contact with the record medium with a uniform, stabilized pressure across the full area in the direction of the track width. Any dust which is carried with the record medium 4 and travelling in the direction of the arrow X will move along the contour of the pads 17D, 20D, in separated paths, ndicated by arrows $Y_1$ and $Y_2$. If any dust moves past the sliding contact region $15a_0D$ in the vicinity thereof, the close contact between the record medium 4 and the region $15a_0D$ which is achieved by the presence of the pads 17D, 20D prevents such dust from moving into the region $15a_0D$, thus allowing such dust to move downstream smoothly without accumulating around the region $15a_0D$.

When an external magnetic field is applied to the magnetic head 10D during a record/playback operation, such external field passes through the main pole shield block 16D and then through the auxiliary pole shield block 19D to be released externally, preventing any influence of the external field upon the record/playback field developed across the main pole block 15D and the auxiliary pole 23D in a similar manner as mentioned above in connection with the magnetic head 10. Accordingly, by utilizing a soft magnetic material to form the pads 17D, 20D which bear against the opposite sides of the record medium 4 while completely surrounding the lower end of the main pole block 15D and the auxiliary pole 23D, between the main pole shield block 16 and the auxiliary pole shield block 19D, the magnetic shielding effect against any external magnetic field can be further improved.

Figure 10:
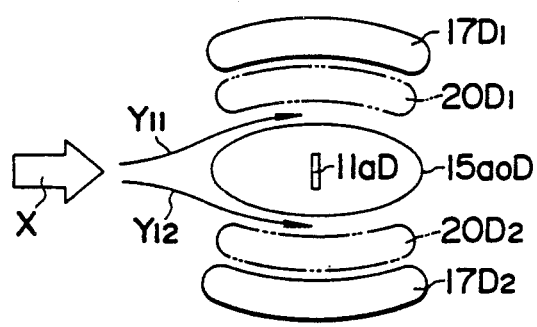
FIGS. 10 and 11 are plan views illustrating modifications of pads which are used with the vertical recording magnetic head of the invention.
Figure 11:
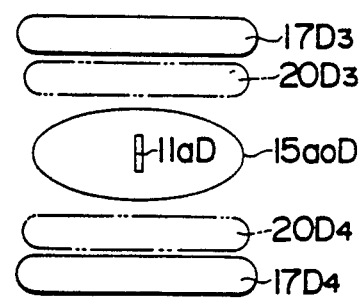

In addition to the pads 17D, 20D illustrated above, pad members which may be used in the vertical recording magnetic head of the invention may comprise pads $17D_1$, $17D_2$, $20D_1$ and $20D_2$ shown in FIG. 10 or pads $17D_3$, $17D_4$, $20D_3$, $20D_4$ shown in FIG. 11, for example. Pads $17D_1$, $17D_2$ shown in FIG. 10 are attached to the lower surface of the main pole shield block 16D in a similar manner as the pad 17D, and are configured so as to correspond to both lateral sides of the elliptical configuration of the pad 17D which are situated in a direction orthogonal to the arrow X. Pads $20D_1$, $20D_2$ are attached to the upper surface of the auxiliary pole shield block 19D in a similar manner as the pad 20D, and are configured so as to correspond to lateral portions of the elliptical configuration of the pad 20D which are situated in a direction orthogonal to the arrow X. As before, they bear against the recording medium 4 along opposite sides of the region $15a_0D$ of sliding contact, as viewed in a direction orthogonal to the direction of the arrow X, thus reducing the resistance which the recording medium 4 experiences during its running. In addition, the sliding contact between the medium 4 and the region $15a_0D$ is stabilized, in particular, achieving uniform pressure for sliding contact with the main pole film surface 11aD over the full track width. In this instance, there is no pad upstream of the region $15a_0D$, but any dust which moves to a point upstream of the region $15a_0D$ is prevented from entering such region as a result of the close contact achieved between the record medium 4 and the region $15a_0D$ by virtue of the presence of the pads $17D_1$, $17D_2$, $20D_1$ and $20D_2$, and are caused to move downstream smoothly along the periphery of the region $15a_0D$, as indicated by arrows $Y_{11}$, $Y_{12}$. Pads $17D_3$, $17D_4$ shown in FIG. 11 correspond to the pads $17D_1$, $17D_2$ shown in FIG. 10, while pads $20D_3$, $20D_4$ correspond to the pads $20D_1$, $20D_2$. These pads $17D_3$, $17D_4$, $20D_3$ and $20D_4$ have linear edges in the direction of the arrow X, and function in a the similar manner as the pads shown in FIG. 10.

The embodiments described above have been applied to a vertical recording magnetic head of auxiliary pole excited type, but it should be understood that they are also applicable to a vertical recording magnetic head of main pole excited type.

The pads 17D, 20D illustrated in FIGS. 9A to 9D have an elliptical configuration, but an annular pad may serve the same purpose. A vertical recording magnetic head which employs an annular pad will now be described.

Figure 12A:
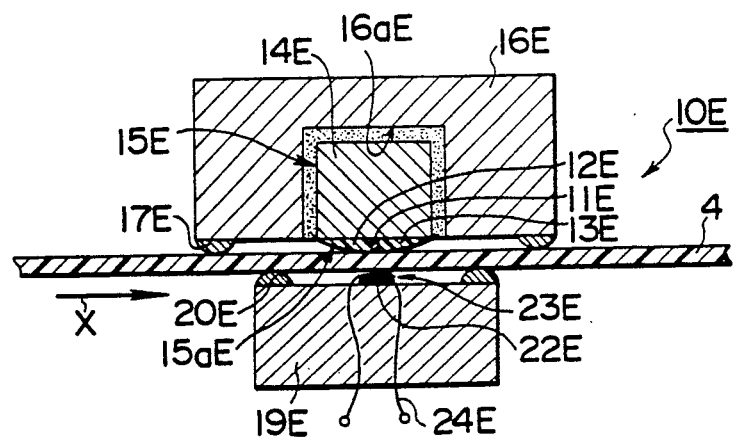
FIGS. 12A to 12D are a cross section and exploded perspective views of a vertical recording magnetic head according to a sixth embodiment of the invention and a plan view showing the arrangement of a pad.
Figure 12B:
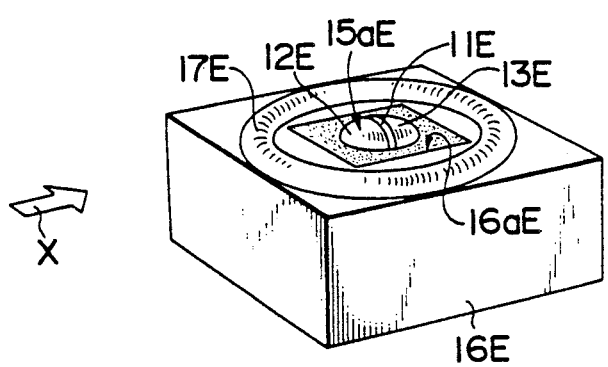
Figure 12C:
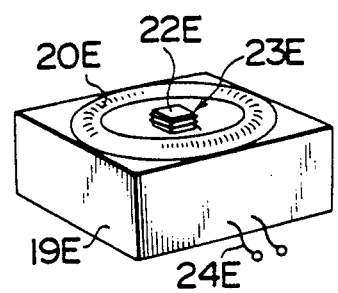

FIGS. 12A, 12B and 12C illustrate a vertical recording magnetic head 10E of auxiliary pole excited type, and comprises a main pole block 15E, a main pole shield block 16E, an auxiliary pole shield block 19E, an auxiliary pole 23E and pads 17E, 20E, generally in a similar manner as the magnetic head 10D.

The main pole shield block 16E is formed of a magnetizable material exhibiting a high magnetic permeability, and is formed with a recess 16aE in which the main pole block 15E is disposed. The main pole block 15E includes a block 14E of a magnetizable material which is embedded into the recess 16aE by filling a clearance defined between the block 15E and the main pole shield block 16E with a non-magnetic adhesive. A pair of main pole sandwich members 12E, 13E are cemented to the lower surface of the block 14E as is a main pole film 11E which is disposed between the sandwich members 12E, 13E, with the members 11E to 13E projecting from the plane defined by the opening of the recess 16aE formed in the main pole shield block 16E.

It will be seen from FIGS. 12A and 12B that the lower end of the main pole block 15E which projects beyond the plane of the opening of the recess 16aE is shaped to present a curved surface which corresponds to part of a sphere. In other words, the main pole block 15E has a spherical surface 15aE for sliding contact with the recording medium. Accordingly, when the spherical surface 15aE is in sliding contact with the flexible recording medium 4, a region $15a_0E$ having a truly circular configuration, as viewed in plan view, which is centered about the lower end face 11aE of the main pole film 11E, will be actually placed in sliding contact with the recording medium 4 to cause a deformation thereof in a truly circular configuration, as shown in FIG. 12D.

Towards the outer ends, the lower end face of the main pole shield block 16E has an annular pad 17E cemented thereto so as to surround the lower end portion of the main pole block 15E. The pad 17E is formed of a lubricating material such as vitreous carbon, for example, and has a semi-circular cross section (see FIG. 12A). Hence, when the lower end face of the pad 17E is in sliding contact with the recording medium 4, the pad 17E will be in sliding contact with the recording medium 4 in an annular region surrounding the region $15a_0E$, as indicated in FIG. 12D.

The auxiliary pole shield block 19E is disposed in opposing relationship, with the recording medium 4 interposed therebetween, with the main pole shield block 16E which is coupled integrally with the main pole block 15E, and is formed of a magnetizable material exhibiting a high magnetic permeability in the same manner as the main pole shield block 16E. As shown in FIG. 12C, an annular pad 20E is cemented to the upper surface of the auxiliary pole shield block 19E toward its outer ends, in surrounding relationship with the auxiliary pole 23E. The pad 20E is also formed of a lubricating material such as vitreous carbon, for example, in the similar manner as the pad 17E, and has a semi-circular cross section (see FIG. 12A). The upper end face of the pad 20E is at an elevation which is slightly higher than the upper end face of the auxiliary pole 23E so as to be in sliding contact with the lower surface or non-record surface of the recording medium 4. Thus, as shown in double chain line in FIG. 12D the pad 20E is in sliding contact with the recording medium 4 in an annular area located between the sliding contact region $15a_0E$ and the pad 17E on the opposite side of the record medium from the latter.

Figure 12D:
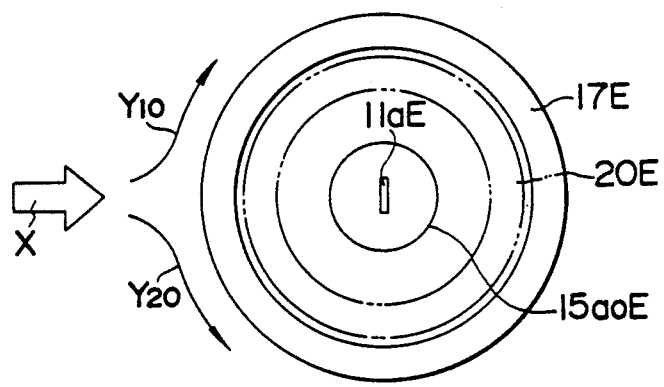

When a magnetic record/playback operation is performed with the magnetic head 10E thus constructed, as the magnetic recording medium 4 runs in the direction of the arrow X in sliding contact with the surface 15aE which is centered about the main pole film 11E while its opposite surfaces are maintained in abutting relationship with the pads 17E and 20E between the main pole shield block 16E and the auxiliary pole shield block 19E the pads 17E and 20E will be in sliding contact with such recording medium 4 in an annular area which surrounds the actual sliding contact region $15a_0E$, as indicated in FIG. 12D, thus reducing the resistance which the record medium 4 experiences for its running, and stabilizing the sliding contact. Any dust which is deposited on the recording medium 4 is prevented from reaching the lower end face 11aE of the main pole film 11E which represents the center of the sliding contact region $15a_0E$, by the presence of the pads 17E, 20E. Stated differently, the pads 17E, 20E are in sliding contact with the record medium 4 on the opposite sides of the sliding contact region $15a_0E$, as viewed in a direction orthogonal to the running direction X or crosswise of the track, thus reducing the resistance which the recording medium 4 experiences for its running. At the same time, the recording medium 4 is reliably held in close contact with the truly circular sliding contact region $15a_0E$ of the surface 15aE of the main pole block 15E, and thus will be in sliding contact with the main pole film 11E with a stabilized, uniform pressure across the full track width. If any dust is carried in the direction of the arrow X as the recording medium 4 runs, pads 17E, 20E act to pass such dust therealong these pads as indicated by arrows $Y_{10}$, $Y_{20}$, as branch flows, and if any dust moves close to the sliding contact region $15a_0E$, it cannot enter such region as a result of the close contact maintained between the record medium 4 and the sliding contact region $15a_0E$ by the presence of the pads 17E, 20E, which allow such dust to move smoothly downstream without causing accumulation around the region $15a_0E$.

A pad member used in various embodiments described above is generally formed of a lubricating material, and hence is subject to abrasion due to its sliding contact with the magnetic record medium. Forming a pad member of a material which is less susceptible to abrasion will provide a more excellent vertical recording magnetic head.

It will be understood that a separation loss caused by the presence of a clearance between a record medium and a main pole must be reduced in order to improve the recording efficiency of a vertical recording magnetic head. It is desirable that the separation between the main pole and the recording medium be reduced toward zero by achieving a perfect close contact therebetween. It is also necessary that the spacing between the tip of the main pole and the tip of the auxiliary pole be maintained at a constant value. Considering the vertical recording magnetic head 10 (see FIG. 5a), for example, the abrasion of the pads 17, 18, 20 and 21 makes it difficult to maintain a constant spacing between both poles, and may also cause damage to the recording medium. To eliminate such disadvantage, the surface of the pads 17, 18, 20 and 21 which is disposed for sliding contact with the recording medium may be coated with an abrasion resistant protective film of inorganic material having a thickness on the order of 1 $\mu$. Suitable inorganic materials include SiC, $SiO_2$, SiN, TiN, $Al_2O_3$ and TiC. When pads 17, 18, 20 and 21 having a protective film on their surface are used, the magnitude of friction which these pads experience during its sliding contact with the recording medium 4 will be reduced, enabling the magnetic head 10 to be maintained in a condition so as to be guided properly and significantly reducing any abrasion or damage caused to the pads and the recording medium 4, thus avoiding a degradation in the recording efficiency.

It is also possible to form the pads 17, 18, 20 and 21 of a material which lends itself to the removal of dust. As mentioned previously, if abraded powder of non-magnetic material or dust suspended in the air is deposited on the recording medium 4 during a record/playback operation, such powder or dust may have an adverse influence upon a record/playback signal and may also cause damage to the main pole film or the record medium. To prevent this, the surface of the pads 17, 18, 20 and 21 may be formed with a thin film which is effective to remove dust. Suitable materials for such thin film include alumina ($Al_2O_3$), chromium dioxide ($CrO_2$), beryllia (BeO). The thin film may comprise a single one of such material or a combination of suitable materials. When such thin film is formed on the surface of the pads 17 to 21, any dust which is deposited on the recording medium 4 may be scraped off therefrom, allowing the recording surface of the medium 4 to be maintained clean. Consequently, the reproduction envelope can be maintained in a proper waveform.

It should be understood that the abrasion resistant protective film or dust removing thin film is not limited in its application to the first embodiment or the pads 17 to 21, but may also equally be applied to pad members of other embodiments described above. In addition, the entire pad may be formed of materials mentioned above, rather than forming only the surface of the pad by a thin layer of such material.

In the described embodiments, the main pole of the vertical recording magnetic head comprises a main pole block which is embedded and secured in a recess formed in the main pole shield block of a magnetizable material which exhibits a high magnetic permeability, by injecting an adhesive into the recess. When such process is used, a spacing d between the upper end face of the block of magnetizable material and the bottom surface of the recess (see FIG. 13) may vary with the amount of adhesive which fills such space, presenting a difficulty in accurately determining the degree of projection of the main pole block from the plane defined by the opening of the recess. Any inaccuracy in the degree of projection of the main pole block results in an unstable contact between the main pole film disposed on the lower end of the main pole block and the record medium to interfere with the performance of good record/playback operation, causing notable variations in the performance of record/playback operation. This aspect is considered in a further embodiment of the invention which is described next.

Figure 13:
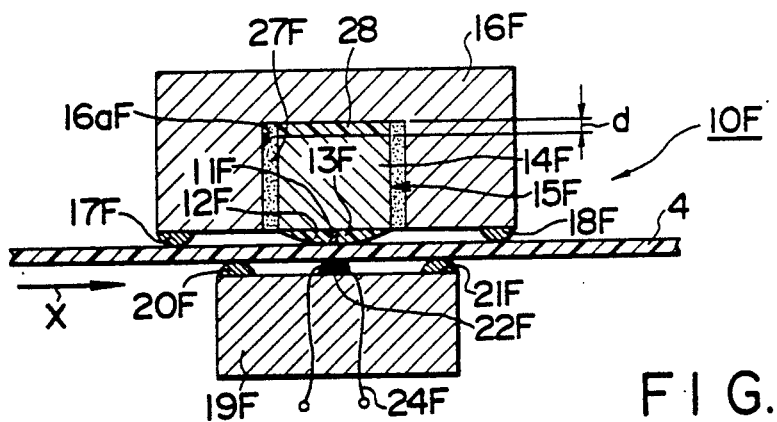
FIG. 13 is a cross section of a vertical recording magnetic head according to a seventh embodiment of the invention.

FIG. 13 shows an embodiment of vertical recording magnetic head 10F in which this aspect is considered. The vertical recording magnetic head 10 of auxiliary pole excited type shown in FIG. 5A is modified. Specifically, in the magnetic head 10F the main pole block 15F is disposed in a recess 16aF formed in a main pole shield block 16F in the same manner as in the magnetic head 10 and is secured in place by a nonmagnetic adhesive 27F such as epoxy resin, water glass or the like. The adhesion takes place between the vertical side of the recess 16aF and the outer side of a block 14F of a magnetizable material, with a non-magnetic spacer 28 interposed between the block 14F of the main pole block 15F and the upper bottom surface of the recess 16aF in the main pole shield block 16F. Thus, when securing the main pole block 15F into the recess 16aF formed in the main pole shield block 16F, the spacer 28 is initially inserted into the recess 16aF, followed by the insertion of the block 14F into the recess 16aF, with a clearance left within the recess 16aF around the block 14F being filled with the non-magnetic adhesive 27F.

The thickness d of the spacer 28 is suitably chosen depending on the precision of the depth of the recess 16aF as well as the precision of the height of the block 14F which is inserted into the recess. By choosing a suitable value for the thickness d the amount by which the main pole block 15F projects beyond the recess 16aF can be determined accurately.

Assuming that the spacer 28 is not provided and the corresponding space is filled with the adhesive 27F, the amount by which the main pole block 15F projects beyond the recess 16aF will vary with the amount of adhesive applied, and if the amount of projection is adjusted before solidification of the adhesive, the amount of projection will change with a change in the volume of the adhesive as it is solidified. However, in the present embodiment, the presence of the spacer 28 provides a magnetic insulation between the block 14F and the main pole shield block 16F while enabling a vertical positioning of both blocks 14F and 16F to eliminate the inconvenience caused by filling the space therebetween with the adhesive. The adhesive 27F, which fills the clearance left around the block 14F′ of magnetizable material which is inserted into the recess 16aF with the spacer 28 interposed therebetween, only serves the very purpose of fixing the main pole shield block 16F and the block 14F of magnetizable material relative to each other while magnetically insulating them from each other, while eliminating any unintended change in the amount by which the block 15F projects out of the recess 16aF. In this manner, the amount of projection of the lower end of the main pole block 15F with respect to the opening of the recess 16aF, or the dimension as measured between the level of the lower end face of the block 16F and the level of the lower end face of the block 15F carrying the main pole film 11F can be determined to a high precision, by merely interposing the spacer 28 therebetween.

Figure 14:
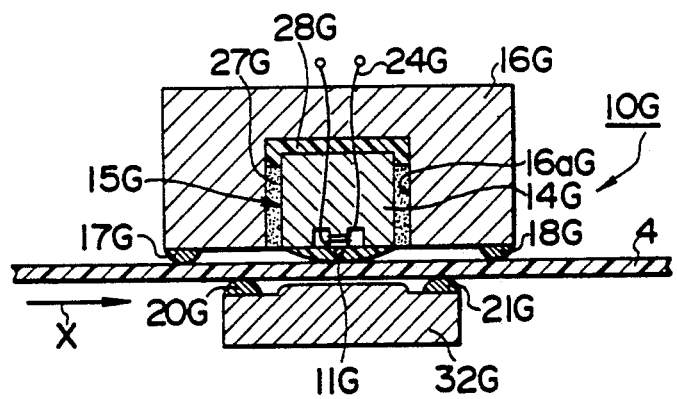
FIG. 14 is a cross section of a vertical recording magnetic head according to an eighth embodiment of the invention.

In the described embodiment, the spacer 28 is in the form of a flat plate, but a number of various configurations may be employed therefor. By way of example, in a vertical recording magnetic head 10G of main pole excited type as illustrated in FIG. 14, a non-magnetic spacer 28G having a crown configuration is disposed on the top end of a block 14G of magnetizable material of a main pole block 15G so as to coat it including part of the lateral surface of the block 14G. In this manner, the spacer 28G is effective to position the main pole block 15G vertical relative to the main pole shield block 16G or to adjust the amount of projection of the lower end of the main pole block 15G out of the recess 16aG in an accurate manner, and is also effective to locate the main pole block 15G centrally of the recess 16aG as viewed in the horizontal direction. This provides a uniform clearance between the block 14G and the main pole shield block 16G on the opposite sides in the horizontal direction, and such clearance is filled with an adhesive 27G to provide an integral construction of the main pole block 15G and the main pole shield block 16G for the magnetic head 10G. In this magnetic head 10G, a more perfect separation is achieved between any external magnetic field which passes through the main pole shield block 16G and an internal recording magnetic head which is developed within the main pole block 15G.

As another modification, the spacer 28 or 28G may be locally perforated, and the perforations may be filled with an adhesive to provide an enhanced adhesion effect between the main shield block 16 (16F, 16G) and the block of magnetizable material 14 (14F, 14G).

However, during the use of the vertical recording magnetic head constructed in the manner mentioned above, an abrasion of the main pole occurs obviously, and eventually reaches the end of its useful life where it fails to maintain a good recording and reproducing function as the use continues over an increased length of time. It will be seen that it is desirable to permit the main pole alone to be replaced by a fresh pole to allow the good recording/playback operation to be continued. to this end, a vertical recording head which permits a replacement of the main pole in a facilitated manner and which is independent from influences of external magnetic fields will now be described.

Figure 15:
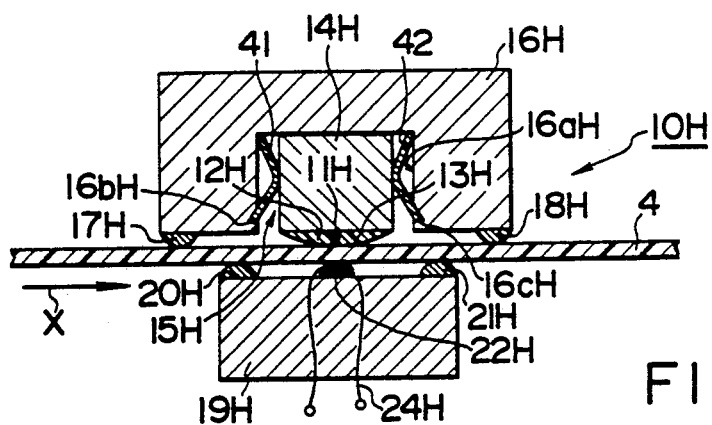
FIG. 15 is a cross section of a vertical recording magnetic head according to a ninth embodiment of the invention.

FIG. 15 shows a vertical recording magnetic head 10H of auxiliary pole excited type which is designed to achieve this end. The head 10H included a main pole shield block 16H which comprises a high permeability magnetizable material such as manganese zinc ferrite, nickel zinc ferrite or the like and is box-shaped including a recess 16aH which surrounds an entire main pole block 15H. Lateral sidewalls of the recess 16aH are formed with small grooves 16bH, 16cH, respectively, which receive and lock one end of leaf springs 41, 42, formed of a non-magnetic material and having a strip configuration, the leaf springs 41 and 42 being disposed within the recess 16aH.

Specifically, the leaf springs 41, 42 have their one end locked in the grooves 16bH, 16cH and their other end disposed in sliding contact with the respective corners of the recess 16aH. These springs are arcuate in cross section. The distance as measured between the tops of the arcuate configurations of the leaf springs 41, 42 is slightly less than the lateral width of the main pole block 15H. Accordingly, when the main pole block 15H is inserted into the recess 16aH, it is firmly held within the recess 16aH under the resilience of the springs 41, 42. With this construction, when the main pole film 11H has sufficiently abraded to cause a failure of maintaining a good recording/playback operation, suitable means may be used to remove the main pole block 15H out of the recess 16aH, and a fresh main pole block may be inserted in place thereof. As before, the head 10H is effective to prevent a reduction in the recording level produced in a record medium if any external field is applied.

Figure 16:
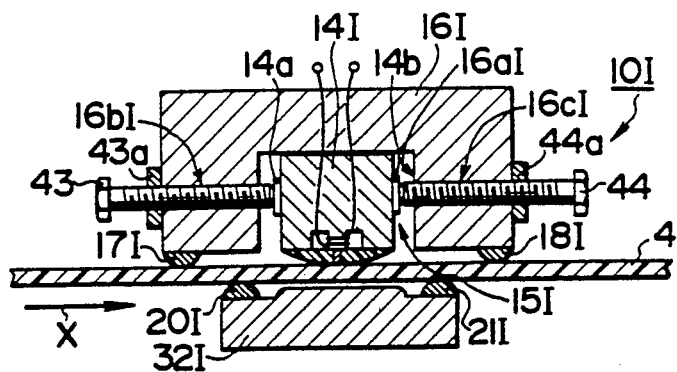
FIG. 16 is a cross section of a vertical recording magnetic head according to a tenth embodiment of the invention.

Likewise, a vertical recording magnetic head 101 may be constructed as shown in FIG. 16. The head 101 is of main pole excited type, and includes a main pole shield block 161 which is formed of a similar material as the main pole shield block 16H mentioned above, and is similarly box-shaped including a recess 16aI. A pair of female threads 16bI, 16cI are formed in the opposite lateral walls defining the recess 16aI, extending horizontally outward. These threads are engaged by male threads 43, 44, which are locked in place by lock nuts 43a, 44a. A pair of abutment pieces 14a, 14b of a non-magnetic material are adhesively secured to suitable locations on the opposite lateral sides of a block 14I of a magnetizable material. A main pole block 15I including the block 14I is inserted into the recess 16aI, and the male threads 43, 44 are then tightened and then the lock nuts 43a, 44a clamped, thus firmly securing the main pole block 15I. With this arrangement, it will be seen that the main pole block 15I can be replaced in a simple manner by initially loosening the lock nuts 43a, 44a and then loosening the male threads 43, 44.

In the embodiment described above, a single main pole block is disposed within a main pole shield block. When a vertical recording magnetic head thus constructed is used, an apparatus which performs a magnetic record/playback operation requires at least a pair of such heads juxtaposed, resulting in an increase in the size and the weight of the head arrangement, and presenting a problem in the head access response. While it is possible to use a single main pole block for both the recording and the playback operation, it is generally difficult to enhance both the recording sensitivity and the playback sensitivity using a main pole film of the same material. Thus, it is usually accepted and desirable that a soft magnetic soft film having a high saturation flux density be used for the recording operation while a soft magnetic soft film exhibiting a high initial permeability be used for the playback operation, thus requiring different materials for the main pole films of the respective heads.

To accommodate for this, there is provided a vertical recording magnetic head in accordance with the invention in which a plurality of main pole blocks are disposed within a single main pole shield block in a manner to prevent influences of any external magnetic field upon the recording/playback output level and which may be used in common for the recording/playback operation or for a multi-channel operation while achieving a reduction in the size and the weight thereof.

Figure 17A:
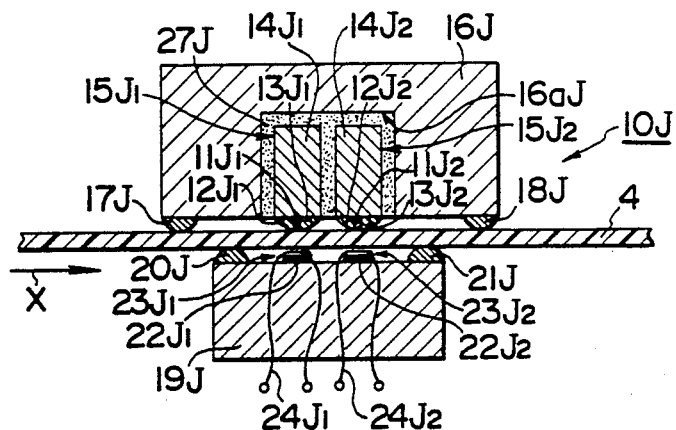
FIGS. 17A and 17B are a cross section and a diagrammatic view showing a vertical recording magnetic head according to an eleventh embodiment of the invention and illustrating paths of the magnetic field, respectively

Specifically, FIG. 17A shows a vertical recording magnetic head 10J of auxiliary pole excited type comprising a main pole block $15J_1$ used for the recording, a main pole block $15J_2$ used for the playback, a main pole shield block 16J, an auxiliary pole shield block 19J and auxiliary poles $23J_1$ and $23J_2$.

The main pole shield block 16J is box-shaped and open toward its bottom, thus defining a recess 16aJ in which the main pole block $15J_1$ and the main pole block $15J_2$ which are used for the recording and the playback operation, respectively, are disposed. An adhesive 27J such as epoxy resin, water glass or the like fills clearances between the main pole shield block 16J and the main pole blocks $15J_1$ and $15J_2$, thus providing an integral construction for the main pole. The main pole blocks $15J_1$, $15J_2$ include blocks $14J_1$, $14J_2$ of a magnetizable material, respectively, which are embedded in the recess 16aJ formed in the shield block 16J, which blocks are formed of a high permeability material such as manganese zinc ferrite, nickel zinc ferrite or the like as is the main pole shield block 16J. The lower end face of the block $14J_1$ has a main pole film $11J_1$ cemented thereto, which is laterally held between a pair of main pole sandwich members $12J_1$, $13J_1$ which may comprise crystallized glass, non-magnetic ferrite or the like. The main pole film $11J_1$ is formed of a soft magnetic material which has a high saturation flux density. Similarly, the lower end face of the block 12 has main pole film $12J_2$ cemented thereto, which comprises a soft magnetic film exhibiting a high initial permeability, with the film $11J_2$ being laterally held between a pair of main pole sandwich members $12J_2$, $13J_2$ which comprises crystallized glass, non-magnetic ferrite or the like. It will be noted that the lower surface of each of the main pole blocks $15J_1$, $15J_2$ is polished into an arcuate configuration, so that the lower end face of each main pole film $11J_1$ or $11J_2$ is exposed and is coplanar with the lower end faces of pads 17J, 18J which are applied to the lower end face of the main pole shield block 16J toward their outer ends.

An auxiliary pole shield block 19J is disposed in opposing relationship with the main pole constructed in the manner mentioned above, with the magnetic recording medium 4 interposed therebetween. The shield block 19J comprises the same high permeability material as used for the main pole shield block 16J and the blocks $14J_1$, $14J_2$. A pair of auxiliary poles $22J_1$, $22J_2$ formed of a material such as a ferrite and in the form of a pillar of a reduced length are either cemented to or integrally formed with the upper surface of the shield block 19J at locations which are opposite to the main pole film $11J_1$ for the recording main pole block $15J_1$ and the main pole film $11J_2$ for the playback main pole block $15J_2$, respectively. Windings $24J_1$, $24J_2$ are disposed around the auxiliary poles $22J_1$, $22J_2$, respectively, thus constituting a pair of auxiliary poles $23J_1$, $23J_2$. It will be seen that a pair of pads 20J, 21J are cemented to the upper surface of the shield block 19J toward the opposite ends thereof.

In use, when a recording operation is to be performed using the head 10J a recording signal is passed through the winding $24J_1$, while a playback signal is derived from the winding $24J_2$ when a playback operation is to be performed.

Figure 17B:
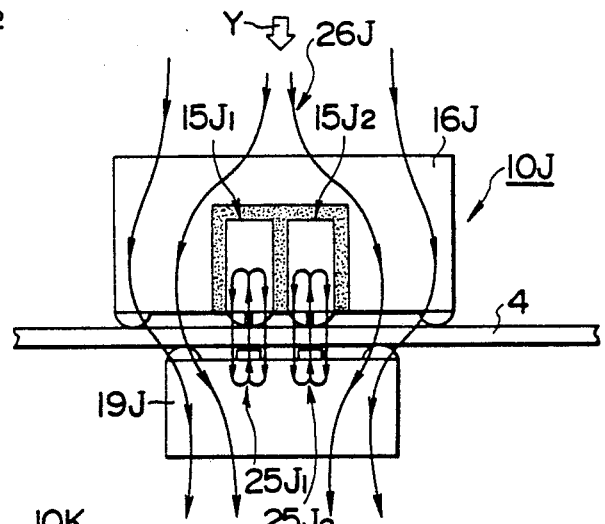

When a recording signal is passed through the winding $24J_1$, a magnetic field is developed which creates a path for magnetic flux indicated by reference character $25J_1$ across the recording auxiliary pole $23J_1$ and the main pole film $11J_1$, as indicated in FIG. 17B. During the playback operation, a magnetic field is developed which creates a path $25J_2$ for magnetic flux across the playback auxiliary pole $23J_2$ and the main pole film $11J_2$. If an external magnetic field, indicated by a solid arrow Y, is applied in a direction perpendicular to the record medium 4 during such process, namely, during the recording operation or subsequent thereto or during the playback operation, such field will create a path 26J for a magnetic flux which passes through the interior of the main pole shield block 16J, the record medium 4 and the auxiliary pole shield block 19J and thence the flux is dissipated into air from the shield block 19J. In other words, such external field is completely separated from the internal field of either the recording field or the playback field, thus preventing its influence upon the internal field. Accordingly, the magnetic head 10J is again capable of effectively preventing any reduction in the recording/playback level which is attributable to the presence of an external field or preventing a reduction in the recorded level in the medium if the magnetic head is brought close to or into sliding contact with the recorded medium. Since both the recording main pole block $15J_1$ and the playback main pole block $15J_2$ are internally housed within the main pole shield block 16J to provide a single head of a reduced size and weight which is capable of performing both a recording and a playback operation, the head access response is improved over a construction in which a separate main pole shield block is associated with each main pole block, thus enabling a high speed head access.

Figure 18A:
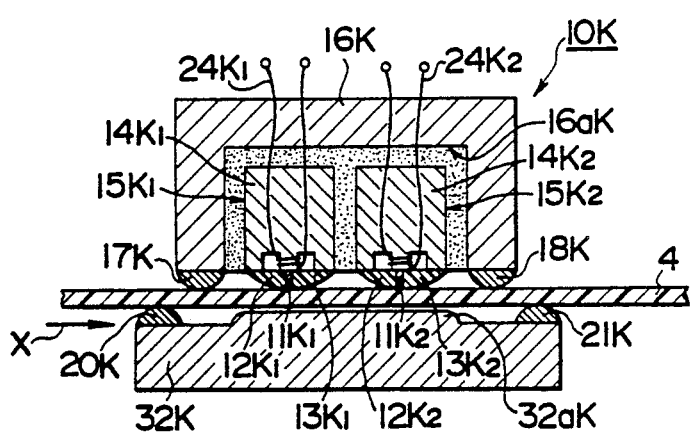
FIGS. 18A and 18B are a cross section of a vertical recording magnetic head according to a twelfth embodiment of the invention and a diagrammatic view showing paths for the magnetic field, respectively.

FIG. 18A shows a vertical recording magnetic head 10K of main pole excited type, comprising a recording main pole block $15K_1$, a playback main pole block $15K_2$, a main pole shield block 16K and a pad mounting shield block 32K.

The recording main pole block $15K_1$ comprises a block $14K_1$ of a magnetizable material, a main pole film $11K_1$ and a pair of main pole sandwich members $12K_1$, $13K_1$. Thus, the block $14K_1$ comprises a high permeability material such as ferrite and is parallelpiped in configuration and has a recess formed centrally in the lower surface thereof. A projection is formed substantially centrally in the recess, and a winding $24K_1$ is disposed around it. The upper end face of the main pole film $11K_1$ is cemented to the projection, and the upper end faces of the main pole sandwich members $12K_1$, $13K_1$ which bear against the opposite lateral sides of the main pole film $11K_1$ are cemented to the lower surface of block $14K_1$.

The playback main pole block $15K_2$ is constructed in a similar manner as the recording main pole block $15K_1$, and comprises a block $14K_2$ of a magnetizable material, a main pole film $11K_2$ and a pair of main pole sandwich members $12K_2$, $13K_2$. A winding $24K_2$ is disposed around a projection which is formed centrally on the lower surface of the block $14K_2$.

The recording main pole block $15K_1$ and the playback main pole block $15K_2$ are disposed, side by side, within a recess 16aK formed in the main pole shield block 16K which comprises a high permeability material so as to be surrounded thereby, with clearances therebetween being filled with an adhesive to provide an integral construction for the main pole blocks $15K_1$, $15K_2$ and the main pole shield block 16K. As shown, a pair of pads 17K, 18K are cemented to the lower end face of the main pole shield block 16K adjacent to its opposite ends.

A pad mounting shield block 32K is disposed below the blocks $15K_1$, $15K_2$, and comprises the same material as that used to construct the main pole shield block 16K and the blocks $15K_1$, $15K_2$. The shield block 32K is in the form of a rectangular plate, and is centrally formed with a raised portion 32aK so as to correspond to the region of the blocks $15K_1$, $15K_2$. A pair of pads 20K, 21K which are semi-cylindrical in cross section, are cemented to the upper surface of the mounting shield block 32K adjacent to its opposite ends.

Figure 18B:
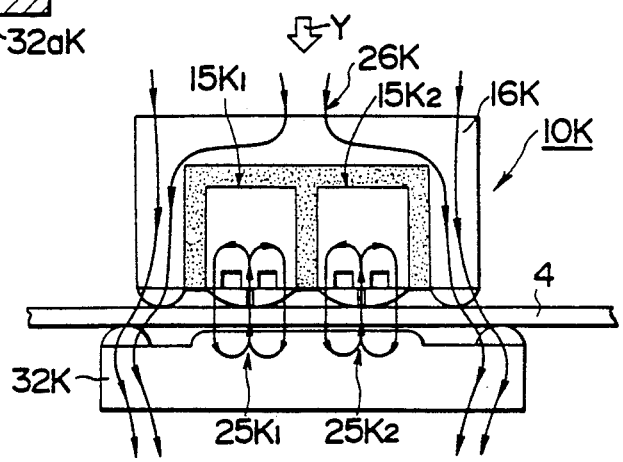

When the head 10K is used to perform a recording or playback operation, if an external field is applied in a direction indicated by a solid arrow Y as shown in FIG. 18B, the recording/playback magnetic paths as indicated by characters $25K_1$, $25K_2$ are completely separated from the path 26K of the external field, thus effectively preventing any problems which may otherwise occur due to the application of the external field, generally in the similar manner as with the magnetic head 10J.

In the magnetic head 10K, the recording main pole block $15K_1$ and the playback main pole block $15K_2$ are also internally housed within the single main pole shield block 16K to be formed into an integral construction, providing a vertical recording magnetic head having a reduced size and weight which is capable of a recording and playback operation. The main pole films $11K_1$, $11K_2$ for the main pole blocks $15K_1$, $15K_2$ can be formed of materials which are chosen to provide an optimum performance for the recording and playback operation, respectively.

Figure 19A:
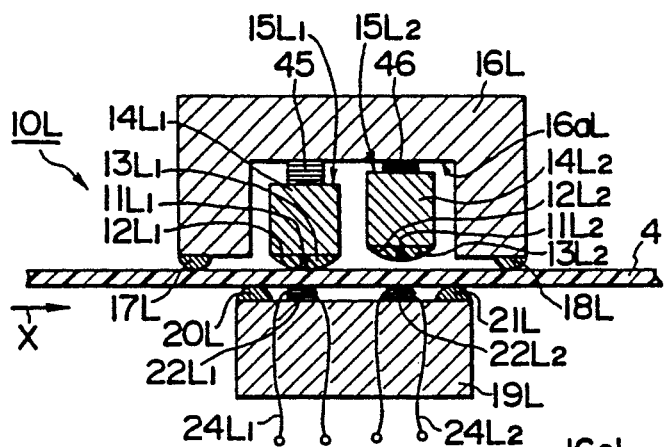
FIGS. 19A and 19B are a cross section of a vertical recording magnetic head according to a thirteenth embodiment of the invention and a diagrammatic view showing paths for the magnetic field.

Another embodiment will now be described in which a main pole block can be moved into contact with or away from a magnetic record medium by means of an actuator. Specifically, FIG. 19A shows a vertical recording magnetic head 10L of auxiliary pole excited type having a pair of main pole blocks $15L_1$, $15L_2$ which can be brought into contact or away from the magnetic recording medium 4 by means of a pair of actuators 45, 46. Specifically, the head 10L includes a main pole shield block 16L of a high permeability material in which a recess 16aL is formed to permit a recording main pole block $15L_1$ and a playback main pole block $15L_2$ to be disposed therein. These main pole blocks $15L_1$, $15L_2$ include blocks $14L_1$, $14L_2$, respectively, of a magnetizable material, the upper end face of which is secured to the bottom surface of the recess 16aL, through the actuator 45 or 46 interposed therebetween. Each of the actuators 45, 46 comprises a laminated piezoelectric element. A pair of pads 17L, 18L are cemented to the lower end face of the main pole shield block 16L for sliding contact with the recording medium 4.

An auxiliary pole shield block 19L is disposed below the main pole shield block 16L and carries a pair of auxiliary poles $23L_1$, $23L_2$ (see FIG. 19B) and a pair of pads 20L, 21L on its upper surface The auxiliary poles $23L_1$, $23L_2$ comprise windings $24L_1$, $24L_2$ disposed around auxiliary pole members $22L_1$, $22L_2$, and are disposed in opposing relationship with the pair of main pole films $11L_1$, $11L_2$ which are disposed on the lower end of the main pole blocks $15L_1$, $15L_2$ and held between pairs of sandwich members $12L_1$, $13L_1$ and $12L_2$, $13L_2$, respectively. The main pole film $11L_1$ may comprise a soft magnetic film which exhibits a high saturation flux density while the main pole film $11L_2$ is formed of a magnetically soft film which exhibits a high initial permeability. The lower end face of each of the main pole films $11L_1$, $11L_2$ is disposed so as to be recessed relatively to the lower end face of the pads 17L, 18L. The purpose of disposing the main pole films recessed relative to the pads 17L, 18L is to enable either one of the recording or the playback main pole blocks to be selectively brought into sliding contact with the record medium, by actuating one of the actuators 45 and 46 while maintaining the other deactuated so as to prevent the associated main pole film from moving into sliding contact with the record medium.

A magnetic recording or playback operation which takes place by using the head 10L will now be described. Initially considering a recording operation, a given voltage is applied to the actuator 45 from a control circuit, not shown, to enable the actuator 45 to extend until the end face of the main pole film $11L_1$ is brought into sliding contact with the recording medium 4. At this time, the opposite surfaces of the recording medium 4 are held between the pairs of pads 17L, 18L and 20L, 21L across the main pole shield block 16L and the auxiliary pole shield block 19L while allowing the recording medium to run in the direction indicatd by an arrow X in sliding contact with the recording main pole film $11L_1$ alone. It will be noted that during a recording operation, the playback main pole film $11L_2$ remains at its position indicated in FIG. 19A, and is held spaced apart from the recording medium 4.

Figure 19B:
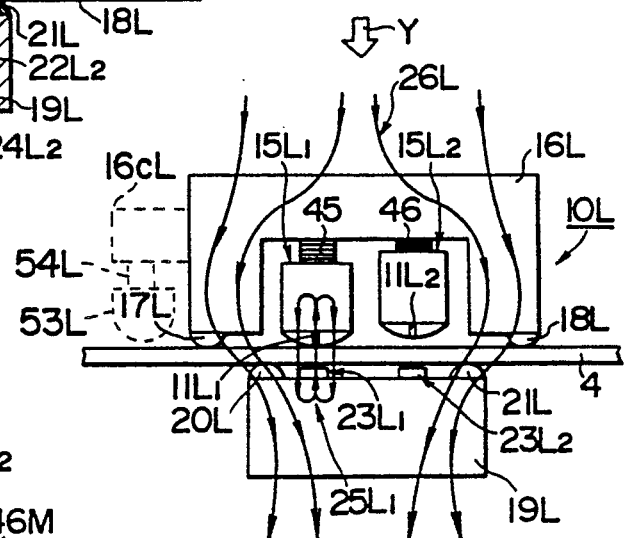

When a recording signal is passed through the winding $24L_1$, a magnetic field is developed as shown in FIG. 19B which creates a path for magnetic flux, indicated by reference character $25L_1$, across the auxiliary pole $23L_1$ and the main pole film $11L_1$ which are associated with the recording operation. If an external magnetic field is applied to the recording medium 4 in a direction perpendicular thereto, as indicated by a solid arrow Y during such recording operation or subsequent to the completion of the recording operation, such external field follows paths 26L, and extends through the main pole shield block 16L and passes through the recording medium 4 in a distributed form to reach the auxiliary pole shield block 19L, whereupon it is released into the air.

During a playback operation, a given voltage is applied to the other actuator 46 to cause it extend, thus bringing the playback main pole film $11L_2$ into sliding contact with the recording medium 4. During the playback operation, a reproduced magnetic field is free from influences of the external magnetic field in the similar manner as during the recording operation.

Figure 20A:
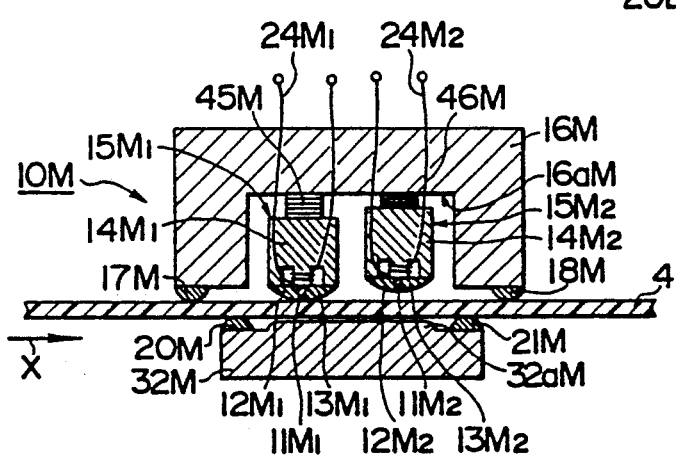
FIGS. 20A and 20B are a cross section of a vertical recording magnetic head according to a fourteenth embodiment of the invention and a diagrammatic view illustrating paths for the magnetic field.
Figure 20B:
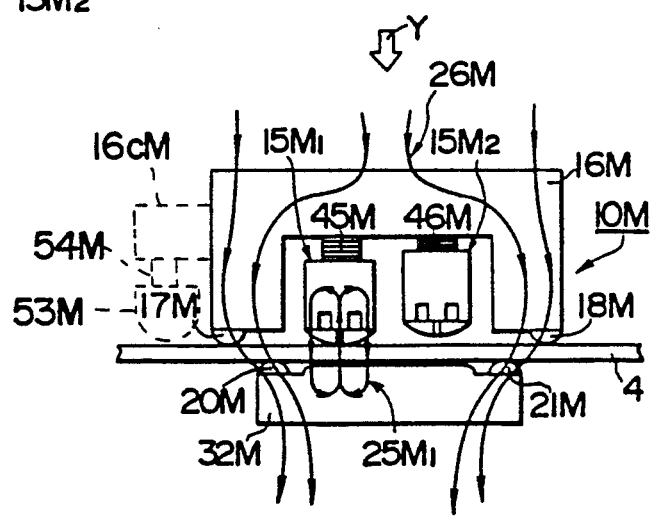

A modification in which the described vertical recording magnetic head is constructed as main pole excited type will now be described. Specifically, FIG. 20A shows a vertical recording magnetic head 10M of main pole excited type including a main pole shield block 16M having a recess 16aM, on the bottom surface of which are disposed a pair of main pole blocks $15M_1$ and $15M_2$, associated with a recording and a playback operation, respectively, with a pair of actuators 45M, 46M interposed therebetween. Each of these blocks $15M_1$, $15M_2$ includes a block $14M_1$ or $14M_2$ of a magnetizable material having a projection on its lower end face around which a winding $24M_1$ or $24M_2$ is disposed. A main pole film $11M_1$ or $11M_2$ is secured to the lower end face of the block $14M_1$ or $14M_2$, and is laterally held between a pair of main pole sandwich members $12M_1$, $13M_1$ or $12M_2$, $13M_2$.

A pad mounting shield block 32M is disposed below the main pole shield block 16M, and is formed of the same material as that used to construct the auxiliary pole shield block 19L (see FIG. 19A) in the form of rectangular plate. The block 32M is centrally formed with a raised portion 32aM which covers the region of the blocks $14M_1$, $14M_2$ while a pair of pads 20M, 21M are cemented thereto to the upper surface thereof adjacent to the opposite ends.

In use, the magnetic head 10M is operated in the similar manner as before. Thus, the actuator 45M is actuated for a recording operation. During such recording operation, a recording magnetic path $25M_1$ is completely separated from the path of any external magnetic field 26M, effectively preventing any problems attributable to the presence of an external magnetic field, as described above. During the playback operation, the actuator 46M is actuated to bring the playback main pole film $11M_2$ into sliding contact with the recording medium 4. Again, the playback operation is free from influences of any external magnetic field.

It will be seen that in the vertical recording magnetic heads 10L and 10M, only one of the recording main pole blocks $15L_1$ or $15M_1$ and the playback main pole blocks $15L_2$ or $15M_2$ is brought into contact with the record medium, so that it is possible to prevent a magnetic field developed in the main pole block $15L_1$, $15M_1$ or $15L_2$, $15M_2$ from influencing upon the other main pole block. Alternatively, one of the actuators which is not associated with the recording or the playback operation being intended, thus, the playback main pole block $15L_2$ or $15M_2$ when the recording operation is intended or the recording main pole block $15L_1$ or $15M_1$ when the playback operation is intended, may be applied with a voltage of the opposite polarity from that used to actuate the intended actuator so as to retract the corresponding actuator to maintain the main pole block $15L_2$, $15M_2$ or $15L_1$, $15M_1$ completely separated from the recording medium 4. It is preferred that the main pole which is not in use be spaced from the surface of a magnetic layer of the recording medium 4 by a distance equal to or greater than 10 μm, for example.

In the embodiments illustrated in FIGS. 17A to 20A, a pair of main pole blocks associated with a recording and a playback operation are surrounded within the main pole shield block, but it should be understood that the vertical recording magnetic head of the invention may comprise three or more main pole blocks which are disposed in the recess formed in the main pole shield block.

Figure 21:
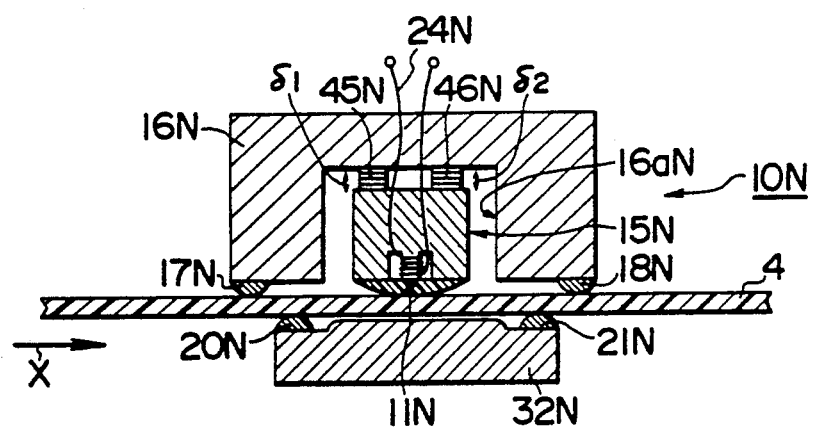
FIG. 21 is a cross section of a vertical recording magnetic head according to a fifteenth embodiment of the invention.

A fine adjustment of a main pole block disposed in a main pole shield block by means of an actuator will now be described. FIG. 21 shows a vertical recording magnetic head 10N of main pole excited type which permits a tilting adjustment for a main pole. Specifically, the head 10N includes a main pole shield block 16N having a recess 16aN formed therein, on the bottom surface of which is mounted a recording main pole block 15N with a pair of actuators 45N, 46N interposed therebetween. A winding 24N is disposed on the block 15N. Assuming that the recording medium 4 is running in a direction indicated by an arrow X during the playback operation, a resulting playback signal is detected by suitable means. A control circuit, not shown, develops a control voltage based on the result of detection, and applies it to the actuator 45N or 46N. Accordingly, the actuators 45N, 46N may be extended or retracted by an amount δ1 or δ2, thus allowing the angle of the main pole film 11N relative to the recording medium 4 to be adjusted. The head 10N also guards the path of internal magnetic field which is associated with either recording or playback operation against any external magnetic field applied, generally in the similar manner as mentioned above.

Figure 22:
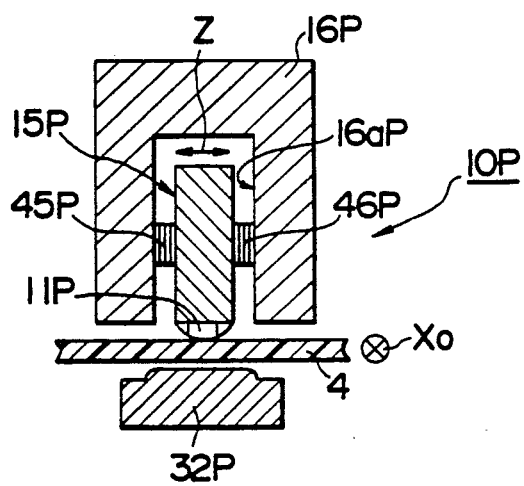
FIG. 22 is a cross section of a vertical recording magnetic head according to a sixteenth embodiment of the invention.

A tracking adjustment can also be achieved. Specifically, FIG. 22 shows a vertical recording magnetic head 10P which permits such adjustment. The head 10P includes a main pole shield block 16P having a recess 16aP formed therein, with a pair of actuators 45P, 46P mounted on the opposite or lateral wall surfaces of the recess 16aP. A main pole block 15P is held sandwiched between the pair of actuators 45P, 46P. A main pole film 11P having a rounded form is defined on the lower end face of the main pole block 15P, and a shield block 32P is disposed below the main pole film 11P. The recording medium 4 runs in a direction moving into the plane of the drawing, as indicated by a mark $X_0$.

When a tracking adjustment is to be made, control voltages from a control circuit, not shown, are applied to the actuators 45P, 46P to move the main pole block 15P in a direction indicated by an arrow Z which is perpendicular to the running direction $X_0$ and in a plane parallel to the surface of the recording medium 4, thus bringing the main pole film 11P into abutment against a desired track position.

Figure 23:
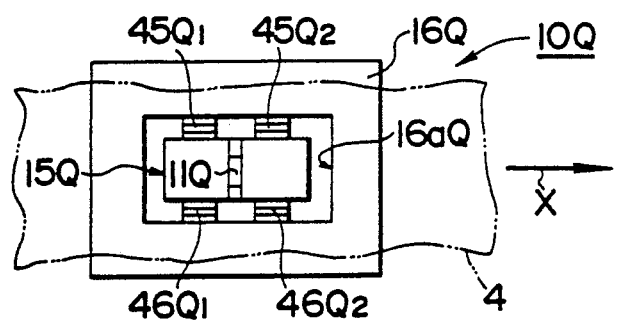
FIG. 23 is a bottom view of a vertical recording magnetic head according to a seventeenth embodiment of the invention.

FIG. 23 shows a vertical recording magnetic head 10Q which permits an azimuth adjustment, as viewed from the side of the record medium 4. As shown, it includes a main pole shield block 16Q having a recess 16aQ formed therein. A main pole block 15Q is mounted within the recess 16aQ by utilizing four actuators $45Q_1$, $45Q_2$, $46Q_1$, $46Q_2$. Thus, the pair of actuators $45Q_1$, $45Q_2$ are interposed between one sidewall of the recess 16aQ and the main pole block 15Q while the other pair of actuators $46Q_1$, $46Q_2$ are interposed between the other sidewall of the recess 16aQ and the main pole block 15Q.

When an azimuth adjustment of the head 10Q is to be made, a reproduced output which is detected through the main pole film 11Q may be derived as the recording medium 4 runs in a direction indicated by an arrow X, and such output may be suitably processed to develop voltages applied to the actuators $45Q_1$ to $46Q_2$ which cause these actuators to extend or retract in a suitable manner. While four actuators are used in this embodiment, a diagonal pair of actuators such as actuators $45Q_1$ and $46Q_2$ may be used alone.

Figure 24A:
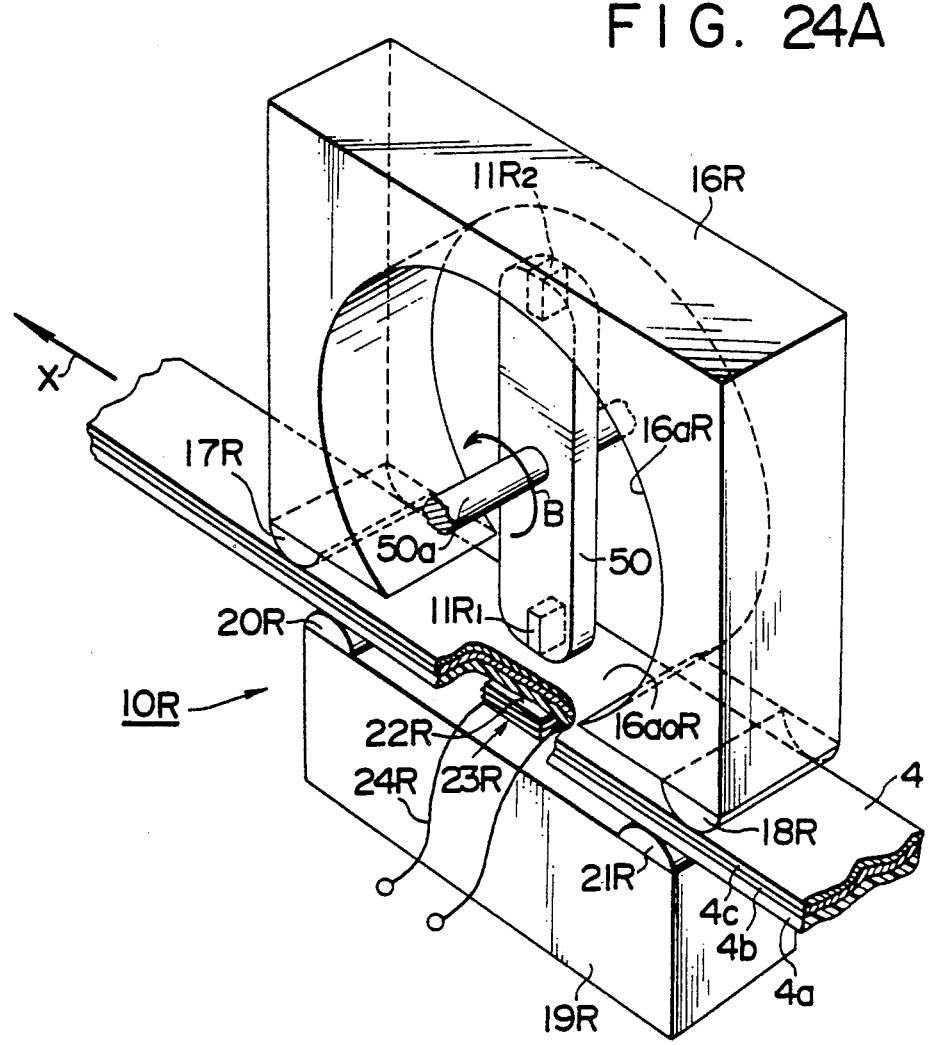
FIGS. 24A and 24B are a perspective view of a vertical recording magnetic head according to an eighteenth embodiment of the invention and a diagrammatic view illustrating paths for the magnetic field.

In the embodiments shown in FIGS. 19A and 20A, the pair of main pole blocks disposed within the main pole shield block have been selectively brought into sliding contact with or away from the recording medium 4 during the recording and the playback operation, by means of the actuators associated with the respective main poles. However, a switching between the recording and the playback main pole can be achieved in a different manner. Specifically, FIG. 24A shows a vertical recording magnetic head 10R of auxiliary pole excited type which permits such a switching operation. The head 10R comprises a support substrate 50 carrying a recording main pole $11R_1$ and a playback main pole $11R_2$ thereon, a main pole shield block 16R and an auxiliary pole shield block 19R.

The support substrate 50 is rotatably supported by a rotary shaft 50a, and the main pole shield block 16R has an inner peripheral wall surrounding the support substrate 50 and which is defined so as to conform to a circular track described by the main pole $11R_1$ and $11R_2$ as the substrate 50 rotates.

The support substrate 50 is formed of a non-magnetic and non-abradable material such as non-magnetic ferrite, ceramic or the like and has an elongate configuration. The main poles $11R_1$ and $11R_2$ each comprises a soft magnetic film which is secured to the opposite ends of the substrate 50, which are angularly displaced 180° from each other on the opposite ends of the rotary shaft 50a. The soft magnetic film for the recording main pole $11R_1$ exhibits a high saturation flux density for purpose of recording while the playback main pole $11R_2$ comprises a soft magnetic film which exhibits a high initial permeability for improved playback efficiency. It will be noted that the support substrate 50 which carries the pair of main poles $11R_1$, $11R_2$ is disposed so as to be rotatable in a plane which is perpendicular to the surface of the recording medium 4. During the recording operation, the main pole $11R_1$ is brought into contact with the surface of a vertical recording layer 4c of the recording medium 4, as shown, so as to be located opposite to an auxiliary pole 23R, which will be described later. During the playback operation, the main pole $11R_2$ is brought into contact with the surface of the recording layer 4c of the recording medium 4 so as to be located opposite to the auxiliary pole 23R. In this manner, the support plate 50 is rotated through 180° between the recording and the playback operation.

The main pole shield block 16R is formed of a high permeability material such as manganese zinc ferrite, nickel zinc ferrite or the like, and is generally in the form of a thick, rectangular plate. An opening 16aR having a diameter which is slightly greater than the length of the support substrate 50 is formed in the block 16R, slightly offset downward from the center thereof. The lower end of the opening 16aR defines an opening $16a_0R$ which is substantially square-shaped. The rotary shaft $50a$ on which the support substrate 50 is mounted is disposed in alignment with the center of the opening 16aR, whereby it can be rotated smoothly in a direction indicated by a circulating arrow B. In this manner, the opening 16aR defines a wall which surrounds a locus of rotation of the main poles $11R_1$ and $11R_2$. A pair of pads 17R and 18R, which are semi-cylindrical in section and which are formed of a lubricating material such as vitreous carbon are cemented to the lower surface of the shield block 16R adjacent to the opposite ends thereof.

An auxiliary pole shield block 19R is disposed below the main pole shield block 16R and is spaced therefrom so as to allow the recording medium 4 to be interposed therebetween. The block 19R is formed of a material similar to that used to construct the main pole shield block 16R, and has a depth which substantially corresponds to the thickness of the shield block 16R. An auxiliary pole 23R is defined substantially on the center of the upper surface of the auxiliary pole shield block 19R, and comprises a winding 24R disposed around an auxiliary pole member 22R which is in the form of a square pillar having a reduced length. In this manner, the auxiliary pole 23R is disposed opposite to either the main pole $11R_1$ or $11R_2$ through the interposed recording medium 4. A pair of pads 20R, 21R, which are semi-cylindrical in section and formed of a lubricating material such as vitreous carbon, are cemented to the upper surface of the auxiliary pole shield block 19R adjacent to its opposite ends.

In use, when a recording operation is to be performed with the head 10R, the main pole $11R_1$ is brought to its lower position, as shown in FIG. 24A, so that the main pole $11R_1$ is in contact with the surface of the magnetic layer 4c of the recording medium 4, and a recording signal current is passed through the winding 24R. In response to the current flow, the auxiliary pole 23R develops a magnetic field which magnetizes the main pole $11R_1$, producing a sharply defined vertical field at its edge, causing the magnetic layer 4c of the recording medium 4 to be magnetized in the vertical direction. In this manner, the recording medium 4 is recorded as it runs in a direction indicated by an arrow X.

During the playback operation, the support substrate 50 is rotated through 180° from the position used during the recording operation, thus bringing the main pole $11R_2$ to its lower position where it is in contact with the recording medium 4. As the recording medium 4 runs horizontally in the direction of the arrow X, a magnetic field which is developed by the vertical magnetization contained in the recording medium 4 is effective to magnetize the playback main pole $11R_2$, and a change in the magnetization of the main pole $11R_2$ induces a voltage which is derived from the winding 24R to provide a playback signal. In this manner, a good magnetic recording and playback response can be obtained with the head 10R. As the recording medium 4 runs, the upper and lower surfaces of the recording medium 4 are held in abutting relationship with the pads 17R, 18R, 20R, 21R, thus maintaining an optimum pressure of sliding contact from either main pole $11R_1$ or $11R_2$.

Figure 24B:
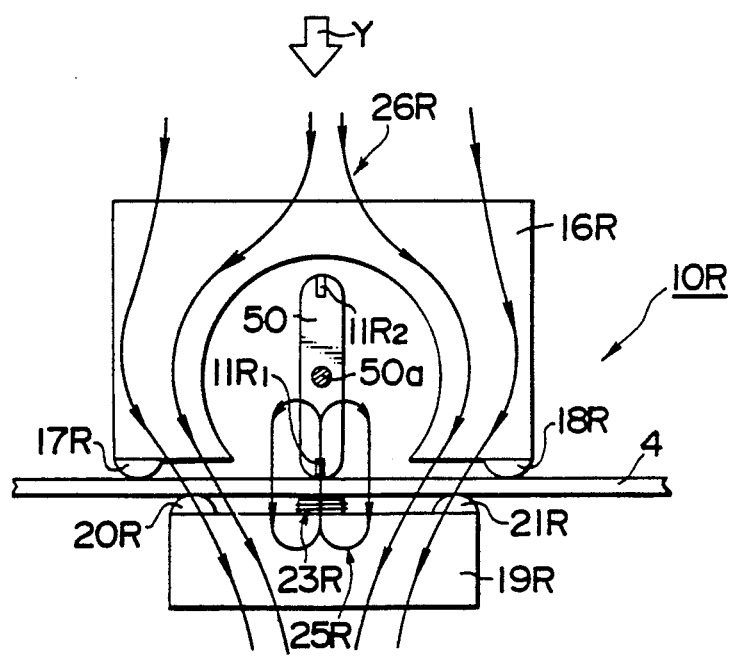

When the magnetic recording operation takes place with the head 10R of auxiliary pole excited type, a magnetic field developed by the auxiliary pole 23R and the main pole $11R_1$ will be shaped as a pair of narrow ellipses, as indicated by reference character 25R in FIG. 24B. If an external magnetic field (as indicated by a solid arrow Y) is applied to the recording medium 4 in a direction perpendicular thereto either during or subsequent to the recording operation, such external field follows paths 26R, thus proceeding downward as divided into lateral halves through the main pole shield block 16R, through the recording medium 4 to the auxiliary pole shield block 19R, from the bottom surface of which it is released into the air. In this manner, the internal field indicated by the character 25R is completely separated from the external field indicated by the character 26R, in a manner similar to that mentioned above, preventing any influence of the external field upon the internal field.

Figure 25:
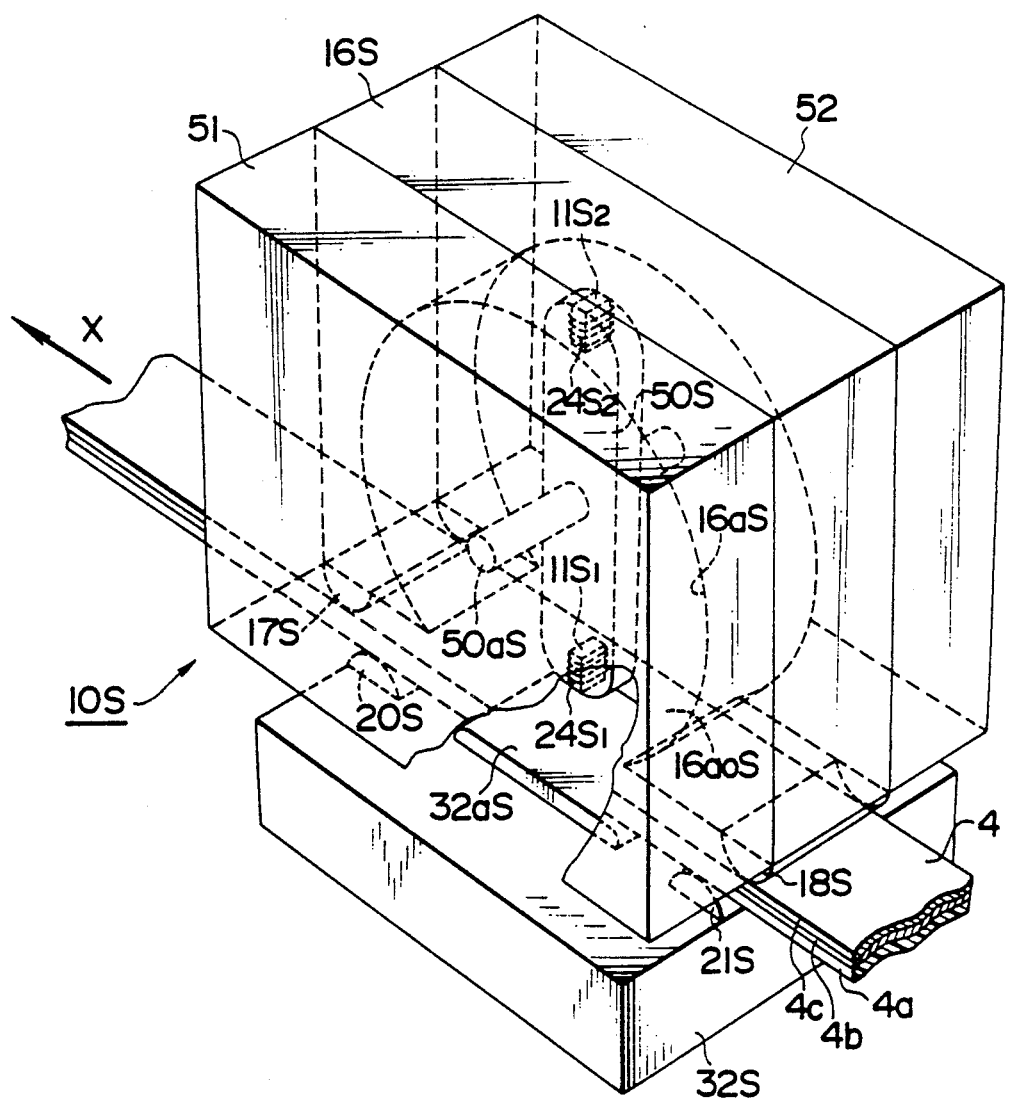
FIG. 25 is a perspective view of a vertical recording magnetic head according to a nineteenth embodiment of the invention.

FIG. 25 shows a vertical recording magnetic head 10S of main pole excited type which represents a modification of the immediately preceding embodiment for enhanced shielding effect. Specifically, the head 10S includes a main pole shield block 16S having an opening 16aS formed therein in which a support substrate 50S carrying a recording main pole $11S_1$ and a playback main pole $11S_2$ is disposed. A recording winding $24S_1$ is disposed around the main pole $11S_1$ while a playback winding $24S_2$ is disposed around the main pole $11S_2$. A pair of shield blocks 51, 52 are cemented to the opposite surfaces of the main pole shield block 16S. These shield blocks 51, 52 are formed of a high permeability material which is similar to that used to construct the main pole shield block 16S, and have a length, a width and a thickness which are identical to those of the shield block 16S. As a result of cementing the shield blocks 51, 52 to the shield block 16S, the opening 16aS is blocked on both the front and the rear side, only leaving the bottom opening $16a_0S$. The support substrate 50S is mounted on a rotary shaft 50aS, the opposite ends of which are rotatably journalled in the shield blocks 51, 52.

A pad mounting shield block 32S is disposed below the main pole shield block 16S with the recording medium 4 interposed therebetween so as to be located opposite to the opening $16a_0S$. The material for the shield block 32S is the same as the high permeability material used for the main pole shield block 16S, and the block 32S has a length as measured in the direction of the arrow X and a thickness which are substantially equal to those of the auxiliary pole shield block 19R (see FIG. 24A). The depth of the shield block 32S is substantially equal to the combination of the thicknesses of the three shield blocks 16S, 51, 52. In a region opposite to either the main pole $11S_1$ or $11S_2$, the upper surface of the pad mounting shield block 32S is formed with a raised portion 32aS.

The operation of the head 10S is similar to that of the head 10R mentioned above in connection with FIG. 24A except for the difference of the head construction in that the head 10S is of main pole excited type while the head 10R is of auxiliary pole excited type. Accordingly, a detailed description is omitted.

If an external magnetic field is applied to the head 10S during the recording or the playback operation, there is obtained a shielding effect which is excellent over that of the head 10R since the main poles $11S_1$, $11S_2$ are substantially confined within the shield blocks 16S, 51, 52 and 32S.

In each embodiment described above, the magnetic head is either a recording head or a playback head, or a combined recording/playback head, but there has been made no reference to an erasure head. Generally, it is a conventional practice to pass a d.c. current through a given coil to develop a magnetic field which is effective to erase a recorded region. The magnetic field developed obviously acts as an external magnetic field, referred to above, and may have an adverse influence upon a recording or playback signal. It is also possible that an erased track may be influenced by the recording or playback head. In accordance with the invention, there is provided a vertical recording magnetic head which avoids an adverse influence of a leakage flux from an erasure head upon a recording or a playback signal and which prevents an undesirable signal from being recorded in an erased track as a result of crosstalk from the recording/playback head.

Figure 26A:
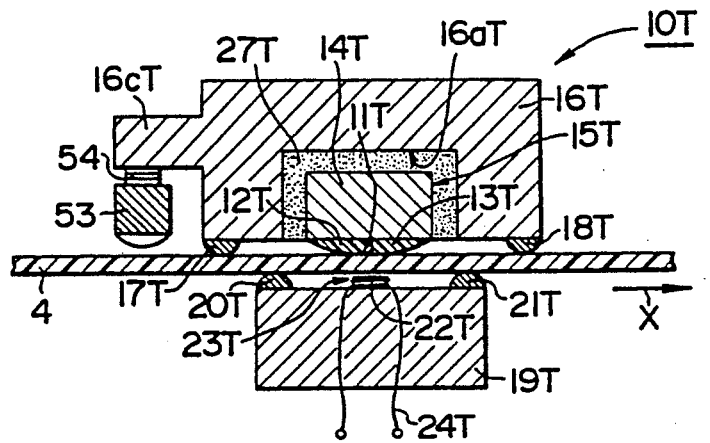
FIGS. 26A and 26B are a cross section of a vertical recording magnetic head according to a twentieth embodiment of the invention and a diagrammatic view illustrating a leakage flux produced from an erase head.

Specifically, FIG. 26A shows a vertical recording magnetic head 10T of auxiliary pole excited type including a main pole shield block 16T having a recess 16aT formed therein in which a combined recording/playback main pole block 15T is secured by filling a clearance therebetween with an adhesive 27T such as epoxy resin. The main pole block 15T includes a block 14T of a high permeability material such as manganese zinc ferrite, nickel zinc ferrite or the like in the similar manner mentioned above, and the main pole shield block 16T is also formed of a high permeability material such as manganese zinc ferrite or the like.

A main pole film 11T of a magnetically soft material which exhibits a high saturation flux density, for example, is cemented to the lower end face of the block 14T and is laterally held between a pair of main pole sandwich members 12T, 13T which comprises a crystallized glass, non-magentic ferrite or the like. The lower surface of the main pole block 15T is polished into an arcuate configuration, exposing the lower end face of the main pole film 11T. It is to be understood that the lower end face of the main pole film 11T lies in the same plane as a pair of pads 17T, 18T which are cemented to the lower end face of the main pole shield block 16T adjacent to the outer ends, the pads being semi-cylindrical in section and formed of a lubricating material such as vitreous carbon.

An arm 16cT extends laterally from one sidewall of the main pole shield block 16T, and an erasure head 53 is mounted on the lower surface of the arm 16cT with an actuator 54, comprising a piezoelectric element, interposed therebetween. The lower end face of the erasure head 53 is formed into a rounded configuration, and the lower end face is normally located slightly above the lower end face of the pads 17T, 18T, preventing its sliding contact with the recording medium 4 However, when a given voltage is applied to the actuator 54, it extends downward, bringing the lower end face of the erasure head 53 into sliding contact with the recording medium 4.

An auxiliary pole shield block 19T is disposed in opposing relationship with and spaced from by the recording medium 4 from the main pole shield block 16T which is integral with and surrounds the main pole block 15T. The auxiliary pole shield block 19T is formed of the same high permeability material as used for the main pole shield block 16T. An auxiliary pole 23T is formed on the upper surface of the auxiliary pole shield block 19T at a location opposite to the main pole film 11T, and comprises an auxiliary pole member 22T formed of a material such as a ferrite in the form of a square pillar of a reduced length and around which a winding 24T is disposed. A pair of pads 20T, 21T, which are semi-cylindrical in cross section and which are formed of the same material as the pads 17T, 18T, are cemented to the upper surface of the shield block 19T adjacent to its opposite ends.

A magnetic recording/playback operation which takes place with the vertical recording magentic head 10T of auxiliary pole excited type will be described. During a recording operation, the recording medium 4 runs in a direction indicated by an arrow X, in sliding contact with the main pole film 11T. When a recording signal is applied to the winding 24T from a signal generator, not shown, a sharply defined magnetic field is developed across the auxiliary pole 23T and the main pole film 11T, thus performing a magnetic recording in the recording medium 4. During a playback operation, a sharply defined magnetic field which is developed across the main pole film 11T and the recording medium 4 can be derived by the winding 24T and then subject to a suitable processing.

When a signal which is once recorded is to be erased, a given voltage is applied to the actuator 54, thus bringing the lower end face of the erasure head 53 into sliding contact with the recording medium 4. After accessing the head to a desired track which is to be erased, an erase signal may be applied to a winding (not shown) on the erasure head 53, thus erasing the intended track.

Figure 26B:
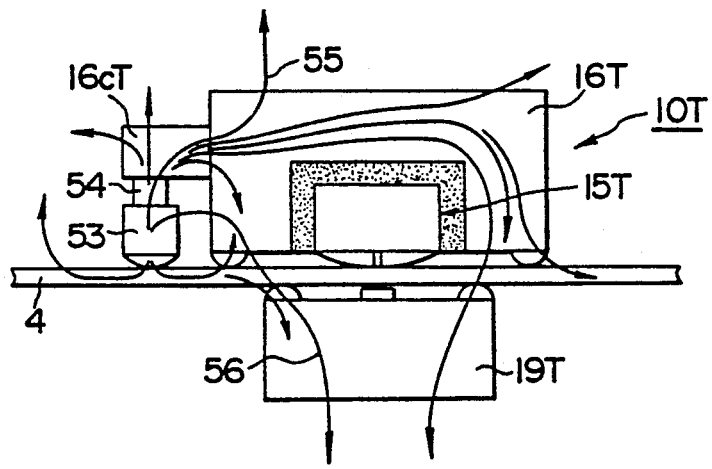

As shown in FIG. 26B, during the erasure process, the erasure head 53 produces a leakage flux, which flux is dispersed by the main pole shield block 16T and the auxiliary pole shield block 19T in a manner indicated by numerals 55, 56, thus preventing its influence upon the main pole block 15T.

On the contrary, it will be noted that an unintended recording of an erased track as a result of a crosstalk occurring from the main pole block 15T is avoided, because the main pole block 15T is surrounded by the main pole shield block 16T and the auxiliary pole shield block 19T, which are effective to prevent an external leakage of flux which may give rise to a crosstalk.

Figure 27:
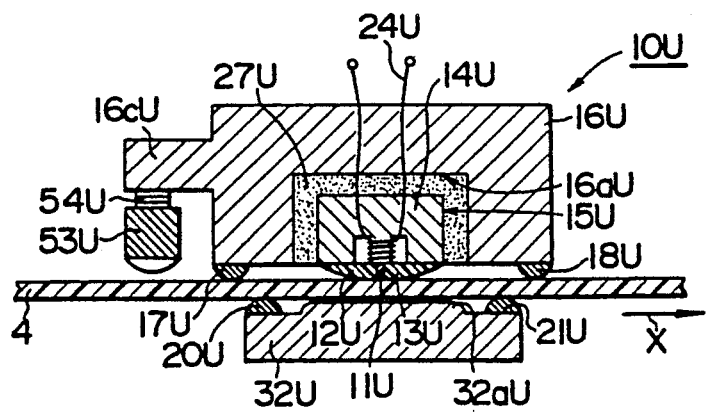
FIG. 27 is a cross section of a vertical recording magnetic head according to a twenty-first embodiment of the invention.

The vertical recording magnetic head 10T is of auxiliary pole excited type, but it may be modified into a head of main pole excited type as shown in FIG. 27. The magnetic head 10U shown in FIG. 27 comprises a main pole shield block 16U having a recess 16aU in which a combined record/playback main pole block 15U is adhesively secured therein as by an adhesive 27U such as epoxy resin. The main pole block 15U includes a block 14U of a magnetizable material having a high permeability such as manganese zinc ferrite, nickel zinc ferrite or the like, which is centrally formed with a projection on its lower end face around which a winding 24U is disposed. A main pole film 11U of a soft magnetic material which exhibits a high initial permeability is cemented to the lower end face of the block 14U and is held between a pair of main pole sandwich members 12U, 13U.

A pad mounting shield block 32U is disposed below the main pole block 15U, and is in the form of a rectangular plate and is formed of the same material as that used for the main pole block 15U and the main pole shield block 16U. A raised portion 32aU is formed centrally on the upper surface of the shield block 32U, and a pair of pads 20U, 21U are cemented to the upper surface of the shield block 32U adjacent to its opposite ends so as to be opposite to the pads 17U, 18U disposed on the lower surface of the main pole shield block 16U with the recording medium 4 interposed therebetween.

An arm 16cU extends from one lateral wall of the main pole shield block 16U, and an erasure head 53U is mounted on the lower surface of the arm 16cU with an actuator 54U interposed therebetween.

It will be seen that the magnetic medium 4 runs between the overall lower surface defined by the lower end faces of the main pole block 15U and the main pole shield block 16U on one hand and the upper surface of the pad mounting shield block 32U including the raised portion 32aU on the other hand while maintaining its abutting relationship with the pads 17U, 18U and the pads 20U, 21U located on the opposite sides thereof.

When the magnetic head 10U is used to perform a magnetic recording or playback operation, the recording medium 4 is run in a direction indicated by an arrow X in sliding contact with the main pole film 11U, with concommittant recording or playback operation.

When an erasure is desired, a given voltage may be applied to the actuator 54U, in a manner similar to the embodiment shown in FIG. 26A, thus moving the erasure head 53U so that its lower end face is in sliding contact with the recording medium 4 while accessing a desired track for which an erasure is desired, and while simultaneously applying an erase signal. As mentioned previously, any adverse influence of a magnetic field emanating from the erasure head 53U upon the main pole block 15U is avoided.

In the embodiments shown in FIGS. 26A and 27, the combined record/playback main pole is fixedly embedded in a recess formed in the main pole shield block, but it should be understood that one or more main poles, which are used for recording or playback operation devotedly, may be separately disposed within the recess.

With a vertical recording magnetic head of auxiliary pole excited type which is constructed in accordance with the invention, an auxiliary pole member around which a winding is disposed is integrally formed on an auxiliary pole shield block which comprises a high permeability material. However, the manufacturing or machining of the auxiliary pole member may be difficult as is the disposition of the winding around it. In addition, an increased magnitude of magnetic coupling between the auxiliary pole member and the auxiliary pole shield block may cause any external magnetic field which passes into the auxiliary pole shield block from the main pole shield block to also find its way into the auxiliary pole member, thus causing an adverse influence upon the record/playback operation. In addition, the magnetic coupling between the auxiliary pole member and the auxiliary pole shield block may cause an increase in the inductance of the auxiliary pole as a result of the contribution of the auxiliary pole shield block in addition to the winding. An increased inductance for a given number of winding turns may increase loading upon a preamplifier which is connected to the magnetic head. Accordingly, the invention provides a vertical recording magnetic head of auxiliary pole excited type which facilitates the manufacture or machining of an auxiliary pole and the disposition of a winding thereon, which prevents an external magnetic field from finding its way into the auxiliary pole member and which prevents an increase in the inductance of the auxiliary pole.

The erasure capability utilized in the main pole excited type vertical magnetic recording head shown in FIG. 27 embodying a single main pole and utilized in the auxiliary pole excited type vertical recording magnetic head shown in FIG. 26A and utilizing a single main pole, may also be utilized in vertical magnetic recording heads of the main pole and auxiliary pole excited types in which separate recording and playback capabilities are provided. For example, FIG. 19B may be provided with an erasure head 53L coupled to arm 16CL by way of actuator 54L. Similarly, in the main pole excited type vertical magnetic recording head shown in FIG. 20B, the erasure head 53M may be coupled to projection 16cM by actuator 54M.

Figure 28A:
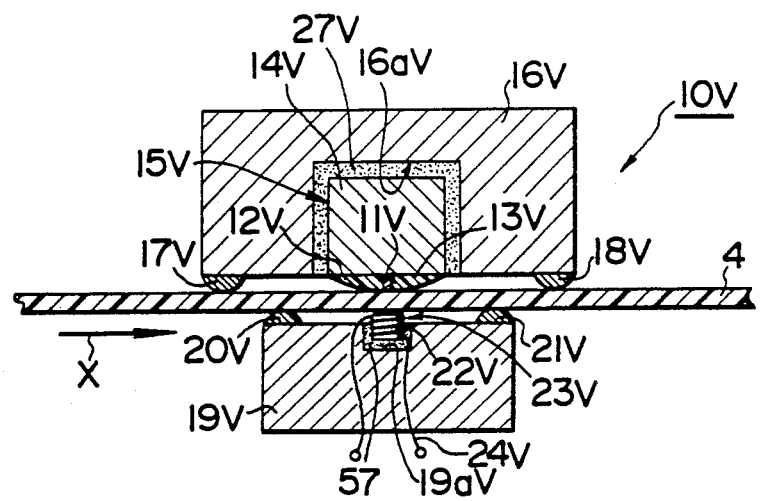
FIGS. 28A to 28D are a cross section and exploded perspective views of a vertical recording magnetic head according to a twenty-second embodiment of the invention and a diagrammatic view showing paths for the magnetic field.
Figure 28B:
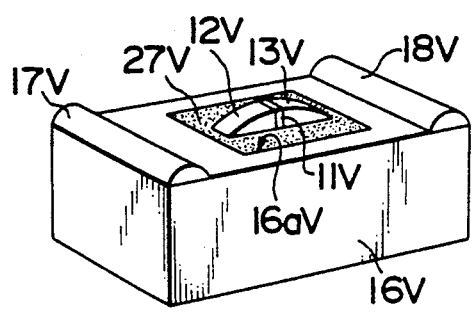
Figure 28C:
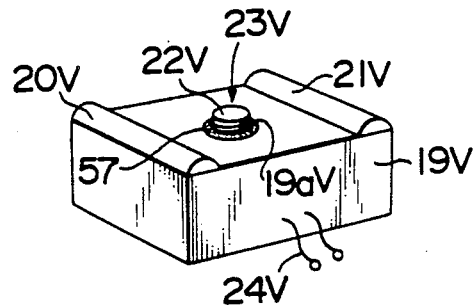

FIGS. 28A, 28B and 28C show such a magnetic head 10V of auxiliary pole excited type comprising a main pole block 15V, a main pole shield block 16V, an auxiliary pole shield block 19V and an auxiliary pole member 22V.

The main pole block 15V comprises a main pole film 11V formed of one of the amorphous magnetic metals described above in connection with the previous embodiments, a pair of main pole sandwich members 12V, 13V formed of crystallized glass, non-magnetic ferrite or the like and between which the both lateral sides of the main pole film 11V is held, and a block 14V of a magnetizable material exhibiting a high permeability such as manganese zinc ferrite, nickel zinc ferrite or the like and having a lower surface which is cemented to the top ends of the main pole film 11V and the sandwich members 12V, 13V. The lower surface of the main pole block 15V is polished into an arcuate configuration, exposing the lower end face of the main pole film 11V.

A main pole shield block 16V is formed of the same material as the block 14V and is box-shaped having a bottom opening. The block 16V has a recess 16aV formed therein in which the block 14V of the main pole block 15V is housed. A non-magnetic adhesive 27V such as epoxy resin, water glass or the like fills the clearance between the blocks 16V and 16V, thus providing an integral construction. A pair of pads 17V, 18V, which are semi-cylindrical in cross section and formed of a lubricating material such as vitreous carbon are cemented to the lower end face of the block 16V adjacent its opposite ends. The lower end face of the main pole film 11V is disposed to be coplanar with the lower end faces of the pads 17V, 18V.

The auxiliary pole shield block 19V is formed of the same high permeability material as that used for the blocks 16V and 14V, and is in the form of a slab having a lateral width which is on the order of two-thirds the width of the main pole shield block 16V. A recess 19aV is formed centrally in the upper surface of the auxiliary pole shield block 19V so as to be located opposite to the lower end face of the main pole film 11V, and an auxiliary pole member 22V which is formed of a material such as ferrite and cylindrical in configuration is disposed within the recess 19aV and is fixedly embedded therein by means of a non-magnetic adhesive 57 which is similar to the adhesive 27V mentioned above. A winding 24V is disposed around the main pole member 22V. It is to be noted that the auxiliary pole member 22V is formed separately from the auxiliary pole shield block 19V, and after the winding 24V is disposed around the member 22V to provide an auxiliary pole 23V, the latter is then embedded within the recess 19aV. In this manner, its manufacture as well as the disposition of the winding 24V are facilitated as compared with an integral construction of the auxiliary pole member 22V with the auxiliary pole shield block 19V. Since the auxiliary pole member 22V is separate from the auxiliary pole shield block 19V with the clearance therebetween filled with the non-magnetic adhesive 57, the magnetic coupling between the pole member 22V and the shield block 19V diminishes. A pair of pads 20V, 21V which are semi-cylindrical in cross section and formed of the same material as the pads 17V, 18V are cemented to the upper surface of the shield block 19V adjacent to its opposite ends.

The surface of the auxiliary pole shield block 19V including the auxiliary pole member 23V is disposed in opposing relationship with and spaced by a suitable air gap from the surface of the main pole block 15V including the main pole film 11V as well as the lower surface of the main pole shield block 16V. The air gap has a very small length, thus presenting an increased resistance to an external magnetic field which attempts to pass therebetween. The recording medium 4 is run through the air gap while it maintains abutting relationship with the pads 17V, 18V and the pads 20V, 21V which are disposed on the opposite sides thereof and in sliding contact with the main pole film 11V, in a direction indicated by an arrow X.

Figure 28D:
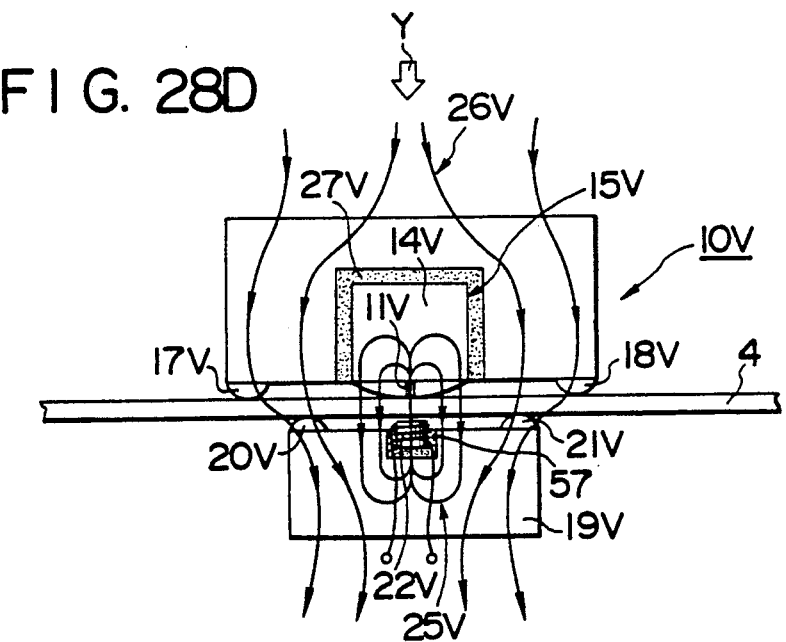

When a magnetic recording operation takes place with the magnetic head 10V mentioned above, a magnetic field developed across the auxiliary pole 23V and the main pole film 11V follows paths 25V in the form of a pair of juxtaposed narrow ellipses across the auxiliary pole member 22V and the main pole block 15V, as indicated in FIG. 28D. If an external field, indicated by a solid arrow Y, is applied to the recording medium 4 in a direction perpendicular thereto either during or subsequent to the magnetic recording operation, such external field will pass through the interior of the main pole shield block 16V along separated paths as indicated by reference character 26V, and passes through the recording medium 4 to enter the auxiliary pole shield block 19V, from the bottom surface of which it is released into the air. Accordingly, as before, the internal field 25V is completely separated from the external field 26V, preventing any influence of an external field upon the internal field. In particular, the magnetic coupling between the auxiliary pole member 22V and the auxiliary pole shield block 19V is decreased in the magnetic head 10V. so that there is no magnetic field passing through the auxiliary pole shield block 19V which finds its way into the auxiliary pole member 22V, thus substantially eliminating the likelihood that such external field may adversely influence a magnetic field developed across the main pole block 15V and the auxiliary pole member 22V. In this manner, a reduction in the recording/playback level attributable to the presence of an external magnetic field as well as a reduction in the recording level which may be caused when the magnetic head is brought close to or in sliding contact with a recorded medium are more effectively avoided. Because the auxiliary pole member 22V is formed separately from the auxiliary pole shield block 19V, it exhibits a reduced inductance as compared with the integral construction, thus reducing the loading upon a preamplifier which is connected to the winding 24V.

Figure 29:
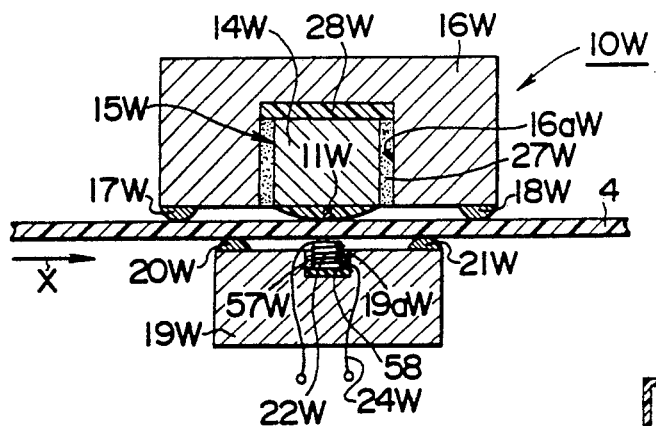
FIG. 29 is a cross section of a vertical recording magnetic head according to a twenty-third embodiment of the invention.

FIG. 29 shows a vertical recording magnetic head 10W which represents a modification of the described embodiment. Specifically, the magnetic head 10W is of auxiliary pole excited type, and includes a main pole shield block 16W having a recess 16aW formed therein. A non-magnetic spacer 28W having a suitable thickness, as used in the embodiment described above in connection with FIG. 13, is disposed on the bottom surface of the recess 16aW, thus reducing the magnetic coupling between the main pole shield block 16W and a main pole block 15W and allowing the distance through which the lower end of the main block 15W projects out of the recess 16aW to be determined with a higher precision. Similarly, a non-magnetic spacer 58 having a suitable thickness is disposed on the bottom surface of a recess 19aW formed in an auxiliary pole shield block 19W, again reducing the magnetic coupling between the shield block 19W and an auxiliary pole member 22W and allowing the distance through which the auxiliary pole member 22W projects out of the recess 19aW to be determined with a higher precision. After the spacers 28W, 58 are disposed in the manner mentioned above, the clearance between the main pole shield block 16W and the main pole block 15W is filled with a non-magnetic adhesive 27W while the clearance between the auxiliary pole member 22W and the auxiliary pole shield block 19W is filled with a non-magnetic adhesive 57W, whereby the main pole block 15W and the auxiliary pole member 22W are firmly secured to the main pole shield block 16W and the auxiliary pole shield block 19W, respectively, as in the embodiment shown in FIG. 28A.

In the described embodiments, the main pole shield block and the auxiliary pole shield block are formed of a solid magnetic material which exhibits a high permeability such as ferrite, permalloy or the like. However, magnetic fluid may be used to construct such a shield block. When ferrite or permalloy is used in a machining operation, it will be seen that the ferrite exhibits an increased hardness and brittleness while the permalloy experiences a magnetic degradation where the material is folded, thus requiring a re-annealing. In addition, the ferrite has a relatively high value of specific gravity, resulting in an increased load upon a motor and an increased access time. It will therefore be seen that the use of a magnetic fluid to construct magnetic shield blocks improves the machineability and allows the specific gravity to be reduced. Such embodiments will now be described.

Figure 30A:
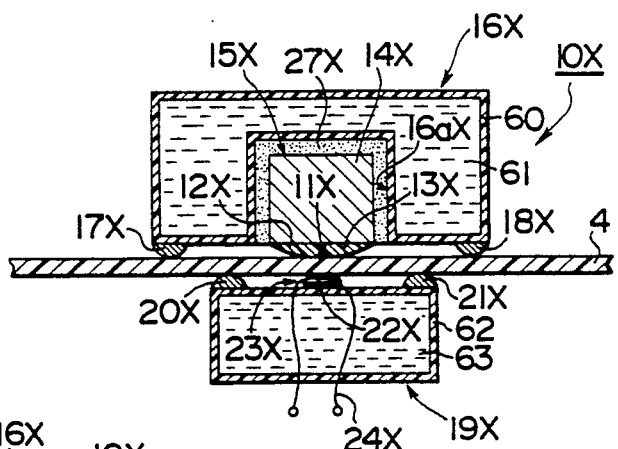
FIGS. 30A and 30B are a cross section of a vertical recording magnetic head according to a twentyfourth embodiment of the invention and a diagrammatic view showing paths for the magnetic field.

FIG. 30A shows a cross section of a vertical recording magnetic head 10X of auxiliary pole excited type which utilizes a magnetic fluid. The head 10X comprises a combined recording/playback main pole block 15X, a main pole shield block 16X, an auxiliary pole shield block 19X and an auxiliary pole 23X.

The main pole shield block 16X generally comprises a box-shaped casing 60 having an open bottom, a magnetic fluid 61 which is confined within the casing 60, and pads 17X, 18X. The casing 60 may be molded from synthetic resin, for example, with a reduced thickness, and magnetic fluid 61 which comprises iron powder is confined within the casing 60 by suitable means. The particles of the magnetic fluid 61 may have a relatively large diameter, for example, 0.2 μm, and is suspended in a solvent such as kerosene, for example, and the fluid has a specific gravity on the order of 1.5 to 2.0. A recess 16aX is defined within the casing 60, and the main pole block 15X is fixedly disposed therein in an embedded manner. The block 15X includes a block 14X of a magnetizable material exhibiting a high permeability such as manganese zinc ferrite, nickel zinc ferrite or the like, and the clearance between the wall of the recess 16aX and the main pole shield block 16X is filled with an adhesive 27X such as epoxy resin, water glass or the like.

A main pole film 11X formed of a soft magnetic material which exhibits a high saturation flux density, for example, is cemented to the lower end face of the block 14X and is held between a pair of main pole sandwich members 12X, 13X which may comprise crystallized glass, non-magnetic ferrite or the like. The lower surface of the main pole block 15X is polished into an arcuate configuration, exposing the lower end face of the main pole film 11X.

A pair of pads 17X, 18X which are semi-cylindrical in cross section and formed of a lubricating material such as vitreous carbon are cemented to the lower end face of the main pole shield block 16X adjacent to its opposite ends, and the lower surfaces of these pads 17X, 18X are adjusted to be coplanar with the lower end face of the main pole film 11X.

The auxiliary pole shield block 19X is disposed in opposing relationship with the main pole defined by the main pole shield block 16X surrounding the main pole block 15X and is spaced therefrom by the recording medium 4. The block 19X comprises a casing 62 which is formed of the same material as the casing 60, magnetic fluid 63 confined within the casing 62 and pads 20X, 21X.

The casing 62 is in the form of a parallelpiped having a cavity in which magnetic fluid 63 is confined by suitable means. It is to be noted that the magnetic fluid 63 may be of a similar material as the magnetic fluid 61. An auxiliary pole member 22X formed of ferrite or the like and in the form of a square pillar having a reduced length is cemented to the upper surface of the casing 62 at a location opposite to the main pole film 11X, and a winding 24X is disposed around the auxiliary pole member 22X to define an auxiliary pole 23X.

The recording/playback operation which takes place with the magnetic head 10X is quite similar to the operation of the various embodiments described above, and therefore will not be specifically described.

Figure 30B:
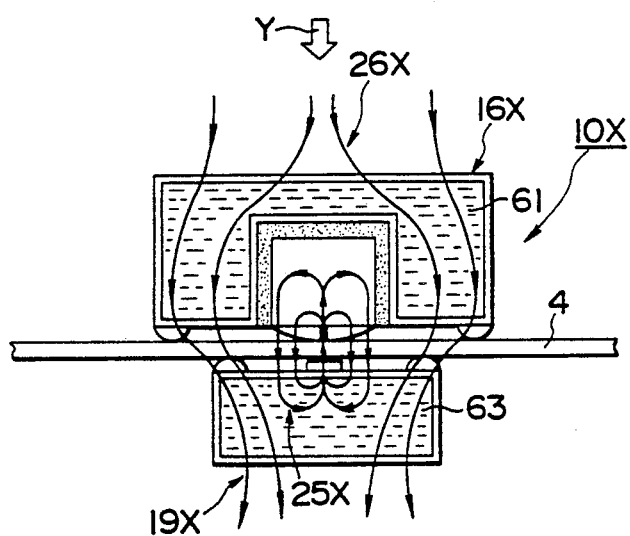

FIG. 30B illustrates that if an external field, as indicated by a solid arrow Y, is applied during the recording operation of the head 10X a resulting flux 26X passes through the magnetic fluid 61 contained in the main pole shield block 16X and through the magnetic fluid 63 contained in the oppositely located auxiliary pole shield block 19X, and thus cannot influence the recording field shown at 25X.

In this embodiment, the casings 60, 62 can be molded in a facilitated manner, and hence the blocks 16X, 19X may be easily shaped in any desired configuration while reducing the weight thereof. Accordingly, when the magnetic head 10X is used in a magnetic recording/playback apparatus, a head access response is improved while alleviating a load upon a head accessing servo system.

Figure 31:
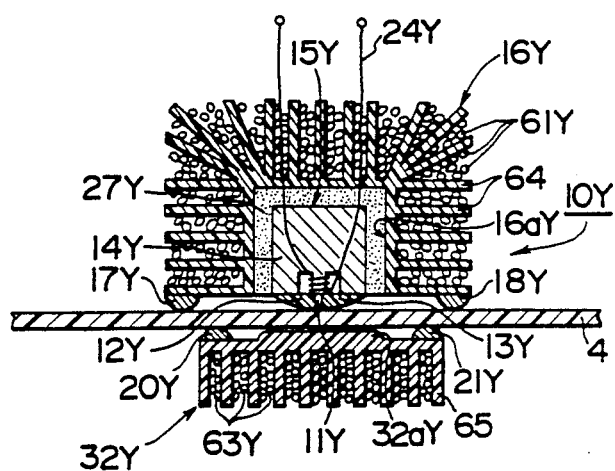
FIG. 31 is a cross section of a vertical recording magnetic head according to a twenty-fifth embodiment of the invention.

FIG. 31 shows a vertical recording magnetic head 10Y of main pole excited type which represents a modification of the previous embodiment. The head 10Y includes a main pole shield block 16Y which comprises a plurality of deposition members 64 for causing magnetic fluid 61Y to be deposited and retained thereon, and a main pole block 15Y. The members 64 are generally arranged to define a box configuration in which a recess 16aY is formed. Thus, a plurality of plate members, which form the deposition members 64, extend radially outward from the region of the recess 16aY and are spaced apart. Magnetic fluid 61Y is deposited on individual plates, and has a viscosity which is substantially greater than the viscosity of the magnetic fluids 61X, 63X shown in FIG. 30A so that it cannot be easily removed once it is deposited.

The main pole block 15Y includes a block 14Y of a magnetizable material which exhibits a high permeability, such as manganese zinc ferrite, nickel zinc ferrite or the like. A groove which is in the form of an inverted E in cross section is formed in the lower end face of the block 14Y, defining a projection around which a winding 24Y is disposed. A main pole film 11Y formed of a soft magnetic material which exhibits a high initial permeability, for example, is cemented to the lower end face of the block 14Y and is held between a pair of main pole sandwich members 12Y, 13Y which comprise crystallized glass, non-magnetic ferrite or the like.

A pad mounting shield block 32Y is disposed below the main pole block 15Y, and comprises a plurality of deposition members 65 which cause magnetic fluid 63Y to be deposited and retained thereon and a pair of pads 20Y, 21Y. It is to be noted that the top ends of the deposition members 65 define a plane, and a raised portion 32aY is defined centrally on the top surface thereof. A plurality of plates extend downward from the portion which defines the top plane at a given spacing, and the magnetic fluid 63Y is deposited on these plates. The pair of pads 20Y, 21Y are semi-cylindrical in cross section and are formed of a material similar to as the pads 17Y, 18Y, and are cemented to the upper surface of the deposition members 65 adjacent to the opposite ends thereof.

The magnetic head 10Y thus constructed operates in a manner similar to that as described above during its recording/playback operation. If an external magnetic field is applied during the recording operation of the head 10Y, the resulting flux passes through the magnetic fluid 61Y contained in the main pole shield block 16Y and the magnetic fluid 63Y contained in the shield block 32Y, in a manner similar to that described above in connection with the magnetic head 10X, thus preventing its adverse influence upon the recording field.

While plate-shaped deposition members are illustrated in this embodiment, such deposition members may be dendritic in configuration.

Figure 32:
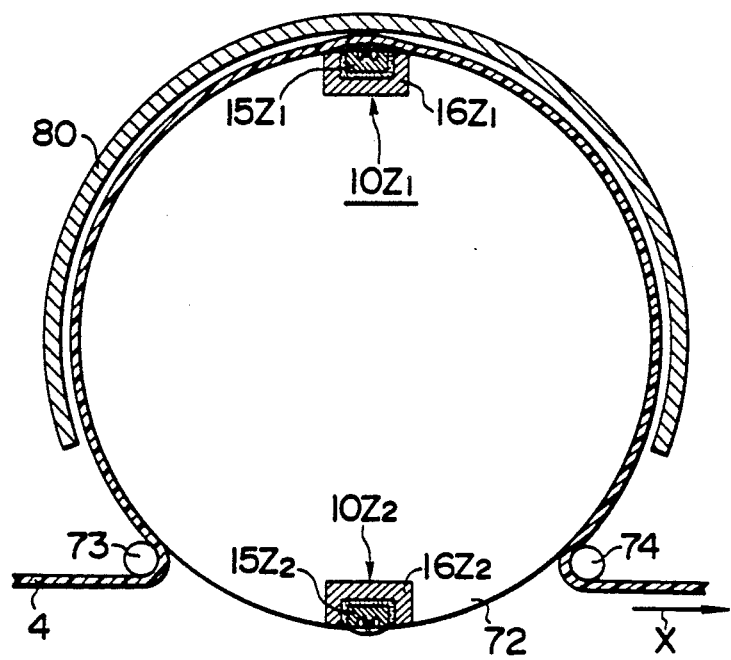
FIG. 32 is a cross section of an essential part of a magnetic recording and reproducing apparatus to which a vertical recording magnetic head of the invention is applied.
Figure 33:
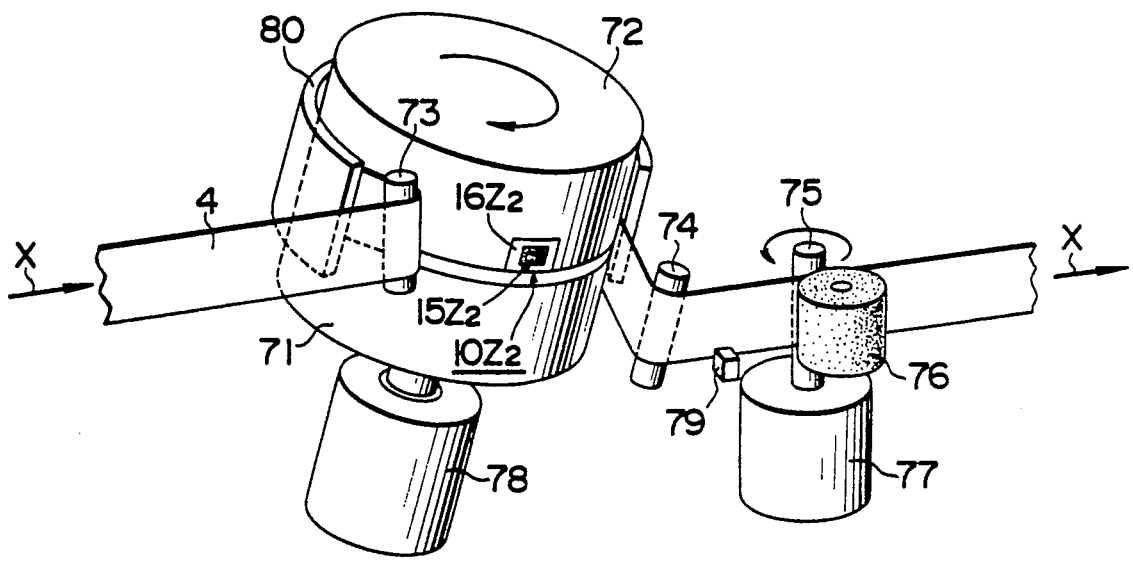
FIG. 33 is a perspective view of the apparatus shown in FIG. 32.

While the vertical recording magnetic head constructed according to the invention is applicable to a magnetic recording/playback apparatus such as existing video tape recorders of VHS or B type, FIGS. 32 and 33 illustrate a magnetic recording/playback apparatus incorporating the vertical recording magnetic head according to the invention. This apparatus represents a video tape recorder of helical scan type. As shown, the magnetic recording medium 4 extends around a stationary cylinder 71 and a rotary cylinder 72 in a helical manner as guided by an inlet guide post 73 and an outlet guide post 74. It is to be understood that the recording medium 4 comprises the flexible base 4a which may comprise a high polymer film, on which the high magnetic permeability layer 4b is formed comprising Fe-Ni-Li, permalloy or the like, with the vertical recording layer 4c formed thereon having an easy axis of magnetization in a direction perpendicular to the surface of the medium, as mentioned previously in connection with FIG. 1. The recording medium 4 extends through a nip between a capstan 75 and a pinch roller 76 so as to be driven for running in a direction indicated by an arrow X as the capstan 75 rotates. The capstan 75 is rotated by a capstan motor 77, and the rotary cylinder 72 is driven by a motor 78. A control head 79 is disposed along a tape path from the outlet guide post 74 to the capstan 75 for recording or reproducing a tracking signal or the like on or from a control track which is located toward the bottom edge of the recording medium 4.

Combined vertical recording/playback magnetic heads $10Z_1$, $10Z_2$ are disposed on the rotary cylinder 72 toward the bottom thereof. (In FIG. 33, the head $10Z_1$ is invisible since it is hidden behind the rotary cylinder 72.) The pair of heads $10Z_1$ and $10Z_2$ are located symmetrically with respect to the center of rotation of the rotary cylinder 72, or spaced apart 180° around the peripheral surface thereof, and the free end of the main pole block of these heads is exposed through the peripheral surface of the rotary cylinder 72. Except for the exposed ends of main pole blocks $15Z_1$, $15_2$, these main pole blocks $15Z_1$, $15_2$ are surrounded by magnetic shield blocks $16Z_1$, $16Z_2$ which are formed of a magnetizable material which exhibits a high permeability.

Figure 34A:
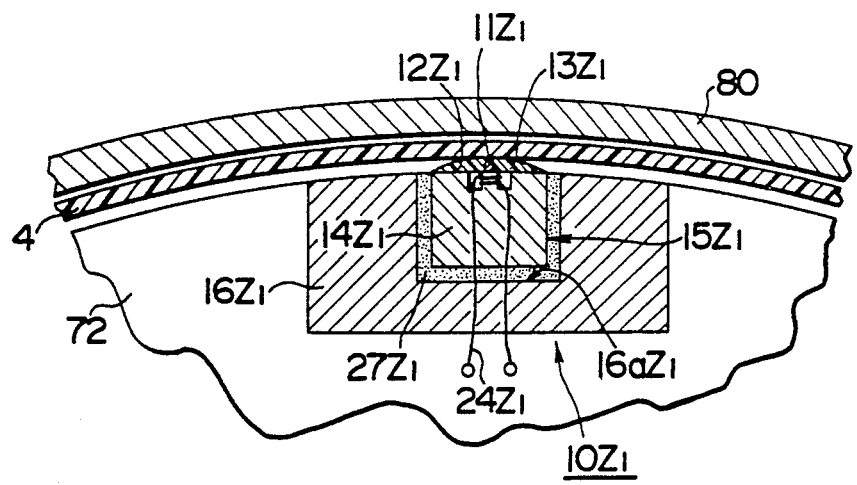
FIGS. 34A to 34C are an enlarged cross section and a perspective view of the vertical recording magnetic head shown in FIG. 32 together with its surrounding region and a diagrammatic view showing paths for the magnetic head, respectively.
Figure 34B:
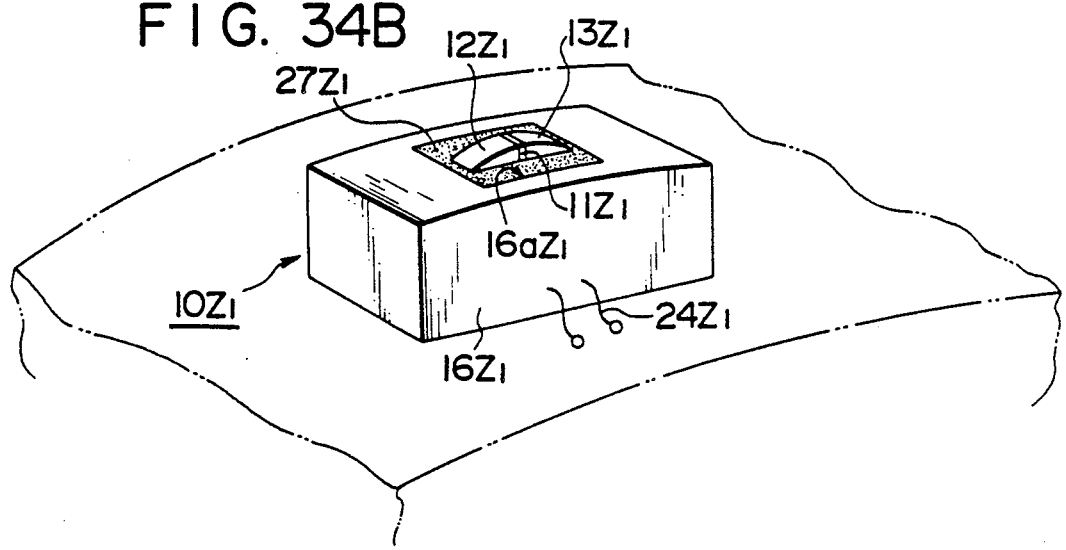

Main pole block $15Z_1$ and magnetic shield block $16Z_1$ of the head $10Z_1$ are shown in more detail by enlarged views of FIGS. 34A and 34B. As shown, the head $10Z_1$ is of main pole excited type, and includes the main pole block $15Z_1$ comprising a block $14Z_1$ of a magnetizable material, a main pole film $11Z_1$ and a pair of main pole sandwich members $12Z_1$, $13Z_1$. The block $14Z_1$ is in the form of a parallelpiped and is formed of a magnetizable material of high permeability such as manganese zinc ferrite, nickel zinc ferrite or the like, and is centrally formed with a recess in its outer surface, with a projection being formed centrally in the recess and provided with a winding $24Z_1$. One end of the main pole film $11Z_1$ is cemented to the projection, and the pair of main pole sandwich members $12Z_1$, $13Z_1$ which support the opposite lateral sides of the main pole film $11Z_1$ in a sandwiched manner are cemented to the end face of the block $14Z_1$. The main pole film $11Z_1$ may comprise amorphous, magnetic metals such as cobalt zirconium niobium, cobalt zirconium molybdenum, or permalloy or sendust while the sandwich members $12Z_1$, $13Z_1$ comprise a non-magnetic ferrite or the like. The surfaces of the main pole film $11Z_1$ and the sandwich members $12Z_1$, $13Z_1$ which are disposed for sliding contact with the recording medium 4 is polished into an arcuate configuration.

A magnetic shield block $16Z_1$ which is box-shaped and formed of the same high permeability material as used for the block $14Z_1$ is disposed in surrounding relationship with the entire main pole block $15Z_1$. Specifically, the magnetic shield block $16Z_1$ is fixed, as by embedding, in a space defined at a given location within the rotary cylinder 72, and the magnetic shield block $16Z_1$ is formed with a recess $16aZ_1$ centrally in its exposed surface which is coplanar with the peripheral surface of the rotary cylinder 72. The block $14Z_1$ of a magnetizable material which is a part of the main pole block $15Z_1$ is embedded in the recess $16aZ_1$. The clearance between the block $14Z_1$ and the magnetic shield block $16Z_1$ is filled with a non-magnetic adhesive $27Z_1$ such as epoxy resin, water glass or the like, thus providing an integral construction of the blocks $15Z_1$ and $16Z_1$. It will be noted that the front end of the block $15Z_1$ projects through a given distance from the plane of the opening of the recess $16aZ_1$ to assure a reliable sliding contact with the recording medium 4 which moves around the outer peripheral surface of the rotary cylinder 72. The magnetic head $10Z_2$ is constructed in an identical manner and is disposed in the rotary cylinder 72 at another given location.

It will be noted that in the video tape recorder, an arcuate wall member 80 is disposed along the peripheral surface of the rotary cylinder 72. The wall member 80 comprises a high permeability material as used for the blocks $16Z_1$, $16Z_2$, and is closely spaced from the locus of rotation of the free ends of the heads $10Z_1$ and $10Z_2$, by a small clearance which defines the path for running the recording medium 4. It is to be noted that the wall member 80 covers the locus of rotation of the heads $10Z_1$ and $10Z_2$ over an arc equal to or greater than 180°.

Figure 35:
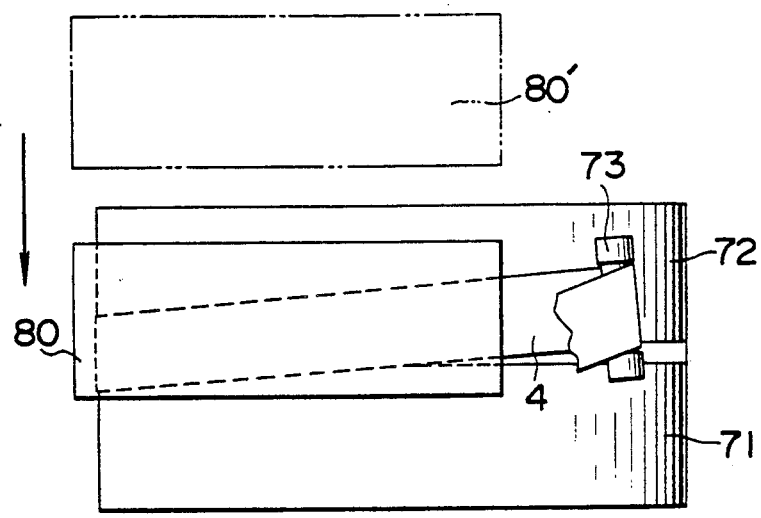
FIG. 35 is a side elevation of the apparatus shown in FIG. 32.
Figure 36:
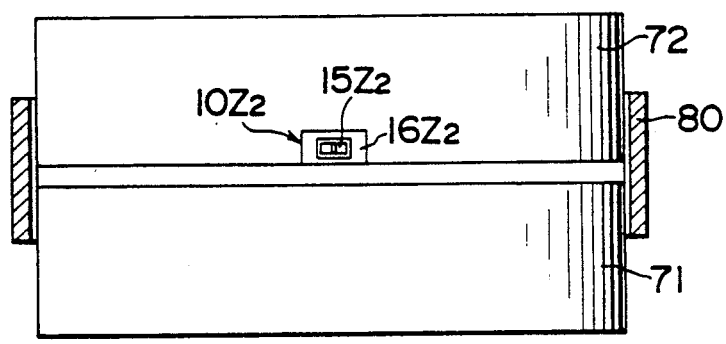
FIG. 36 is a front view, partly broken away, of the apparatus shown in FIG. 32.

The wall member 80 is vertically movable in a direction parallel to the peripheral surface of the rotary cylinder 72 so that upon loading or disposing the recording medium 4 around the peripheral surface of the stationary cylinder 71 and the rotary cylinder 72 in a given region, the wall member 80 is previously brought to a position 80' shown in phantom line in FIG. 35 which is above the rotary cylinder 72 and where it does not interfere with the loading, but that after the recording medium 4 is loaded in a given position, the wall member 80 is lowered to a given elevation as indicated in FIGS. 35 and 36 where it is located opposite to the heads $10Z_1$ and $10Z_2$.

Figure 34C:
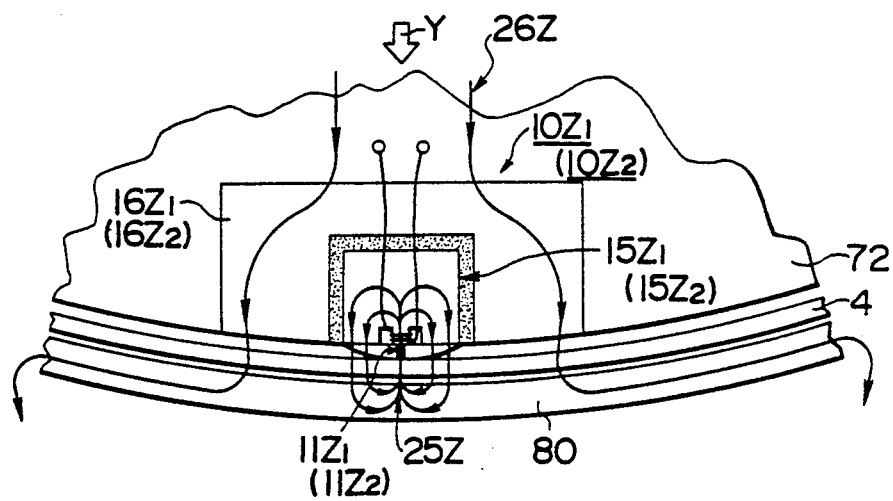

During a recording/playback operation of the magnetic recording and playback apparatus, the recording medium 4 runs in a direction indicated by an arrow X shown in FIG. 32, and the heads $10Z_1$ and $10Z_2$ carried by the rotary cylinder 72 rotate, as the cylinder 72 rotates, to effect a helical scan of the running recording medium 4 for performing a recording or playback operation. When a recording operation takes place, for example, by the heads $10Z_1$ and $10Z_2$, a magnetic field developed by the main pole films $11Z_1$, $11Z_2$ of these heads follow paths 25Z shown in FIG. 34C, which are in the form of a pair of laterally juxtaposed narrow ellipses, to record on the medium 4 as the heads $10Z_1$, $10Z_2$ are located opposite to the wall member 80 through the interposed recording medium 4. If an external field, as indicated by a solid arrow Y, is applied to the recording medium 4 either during or subsequent to the magnetic recording, such external field will follow paths 26Z, which are divided laterally as it proceeds through the interior of the magnetic shield blocks $16Z_1$, $16Z_2$, and after passing through the recording medium 4, they reach the wall member 80 where they travel along the wall member 80 in directions away from the heads $10Z_1$, $10Z_2$ to be released into the air. In other words, the internal magnetic field or recording field as indicated by the paths 25Z are completely separated from the external magnetic field as indicated by the paths 26Z and which are spaced outside, thus assuring that an external magnetic field cannot influence the recording field. The same applies to a playback operation. Accordingly, a reduction in the recording/playback level attributable to the presence of an external magnetic field as well as a reduction in the recorded level of the medium when the vertical recording magnetic head is brought close to or into sliding contact with the recorded medium can be effectively avoided.

In the above embodiment, the wall member 80 has been described as comprising as a single member of high permeability material which is the same as used for the magnetic shield blocks $16Z_1$, $16Z_2$ surrounding the main pole blocks $15Z_1$, $15_2$, the wall member may comprise a hollow arcuate wall member which may alternatively be formed of a plastic material and in which magnetic fluid, as used with the magnetic heads 10X, 10Y are injected.

The heads $10Z_1$, $10Z_2$ are of main pole excited type, but a similar head of auxiliary pole excited type can also be constructed. In this instance, an exciting winding may be disposed on the wall member 80 to provide an integral magnetic construction for the auxiliary pole.

It should be understood that the use of the vertical recording magnetic head of the invention is not limited to a video tape recorder, but such head is also applicable to an audio tape recorder.

Another embodiment of the invention as applied to a vertical recording magnetic head which is manufactured according to thin film technology will be described. As compared with a normal magnetic head, a thin film head provides advantages that (1) the size can be reduced and a multiple track implementation is possible; (2) the manufacturing cost can be reduced and a uniform response can be assured by a mass production; and (3) a low inductance facilitates the achievement of a broad band response. Accordingly, such head is increasingly finding applications in magnetic recording and playback apparatus such as magnetic disc units. For this reason, a vertical recording magnetic head of thin film type which is less susceptible to the influence of an external magnetic field is desired.

Figure 37:
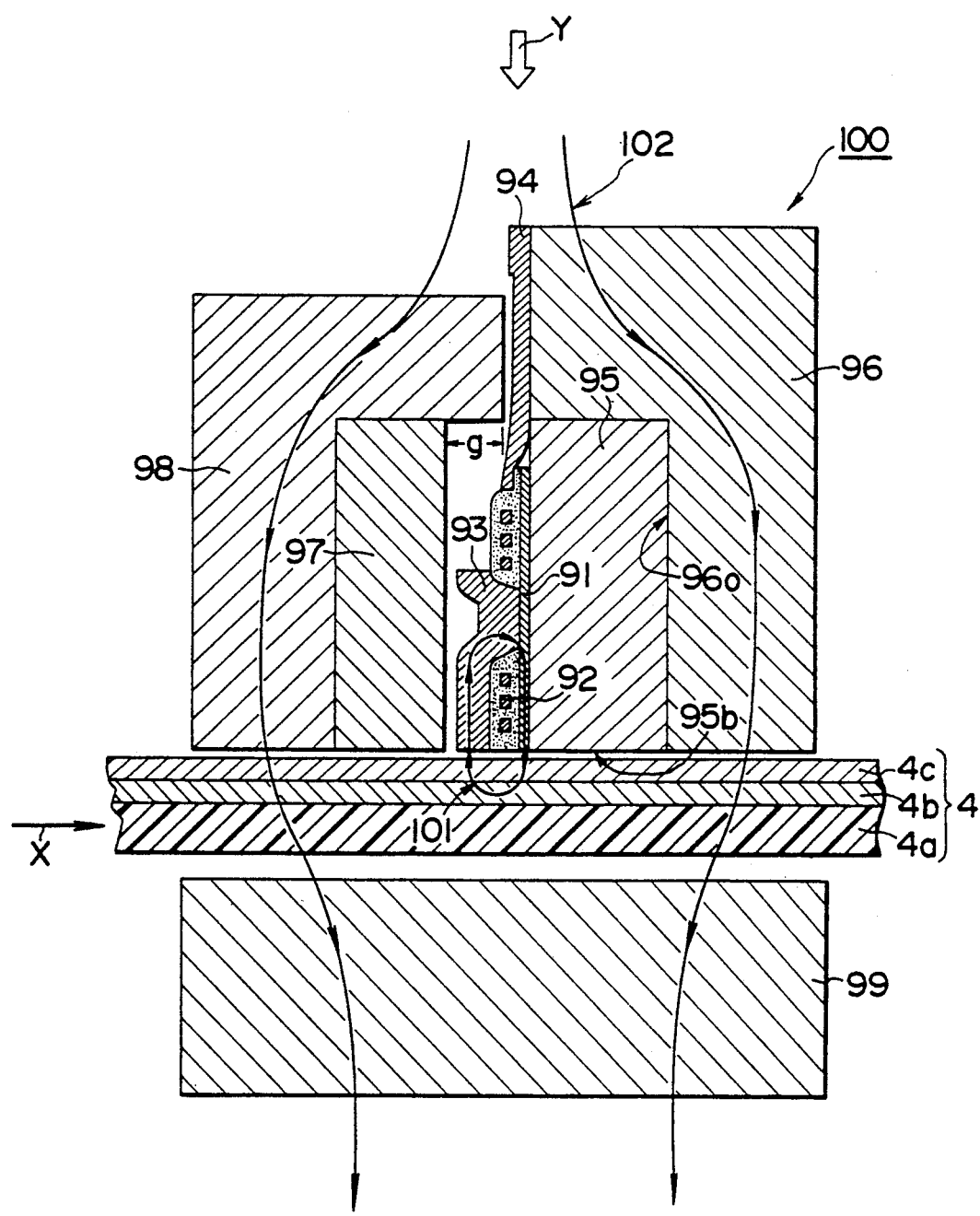
FIG. 37 is an enlarged end view of a vertical recording magnetic head according to a twenty-sixth embodiment of the invention.

FIG. 37 shows a vertical recording magnetic head of thin film type according to the invention in an enlarged section. As mentioned previously, the recording medium 4 comprises flexible base 4a formed of a high polymer film, magnetic layer 4b of a high permeability which may be formed of Fe-Ni, permalloy or the like and which is deposited on the base 4a, and the vertical recording magnetic layer 4c formed thereon and having an easy axis of magnetization which is perpendicular to the surface of the medium. A magnetic head 100 shown comprises a substrate 95 which is formed with a main pole 91, a winding conductor 92 and a reflux pole 93, a first magnetic substrate 96 which surrounds the substrate 95 and provides a magnetic shield, a lead 94 formed on the substrate 96, a non-magnetic protective member 97 disposed in opposing relationship with a patterned surface of the substrate 95, and a second magnetic substrate 98 disposed in opposing relationship with the first magnetic substrate 96 in surrounding relationship with the protective member 97 and which provides a magnetic shield.

Figure 38A:
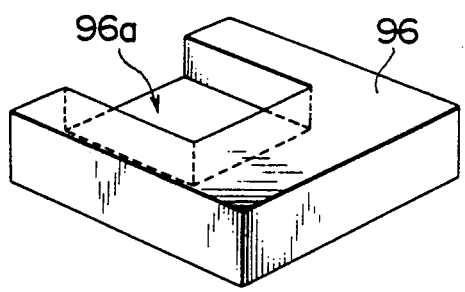
FIGS. 38A to 38C are perspective views illustrating a procedure of constructing one component of a thin-film vertical according magnetic head shown in FIG. 37.
Figure 38B:
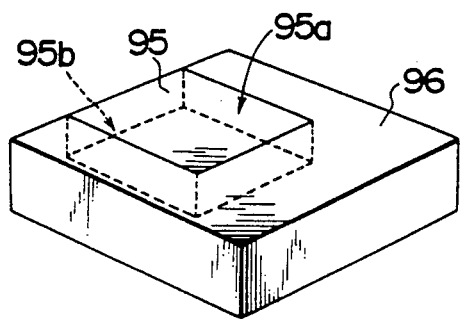
Figure 38C:
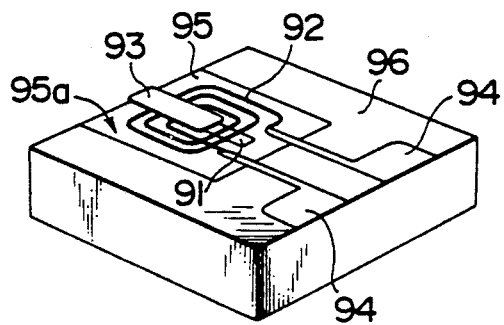
Figure 38C:

The head 100 can be manufactured as follows: As shown in FIG. 38A, the first magnetic substrate 96 is formed of a high permeability material such as magnetic ferrite and in the form of a parallelpiped. It is initially formed with a rectangular recess 96a which opens into two mutually perpendicular surfaces. As shown in FIG. 38B, the substrate 95 is fitted into the recess 96a, and is then integrally secured to the magnetic substrate 96 as by adhesion. Two of the surfaces of the substrate 95 as it is integrally connected to the magnetic substrate 96 which are exposed through the recess 96a, namely, the upper surface 95a as viewed in FIG. 38B and the front side surface 95b (which is referred to hereafter as front end face) located opposite to the medium 4 (see FIG. 37), are polished to be coplanar with the surface of the magnetic substrate 96. Subsequently, the polished upper surface 95a of the substrate 95 is formed with a thin film pattern in the sequence of the main pole 91, the winding conductor 92 and the reflux pole 93, as shown in FIG. 38C. The main pole 91 and the reflux pole 93 may be formed of amorphous magnetic metals such as cobalt zirconium niobium, cobalt zirconium molybdenum, permalloy, sendust or the like. It is to be noted that the respective patterns for the main pole 91, the winding conductor 92 and the reflux pole 93 are formed by a well-known multi-layer wiring technology with insulating layers interposed therebetween. One end of the main pole 91 and the reflux pole 93 is exposed through the lateral side 95b of the substrate 95 (see FIG. 37). After the magnetic head pattern is formed on the substrate 95, a thin film which defines a pair of leads 94 is formed on the upper surface of the magnetic substrate 96 for connection with the opposite ends of the winding conductor 92. The remaining ends of the pair of leads 94 extend to the rear end of the first magnetic substrate 96 which is located opposite from the front end face 95b of the substrate 95.

Figure 39A:
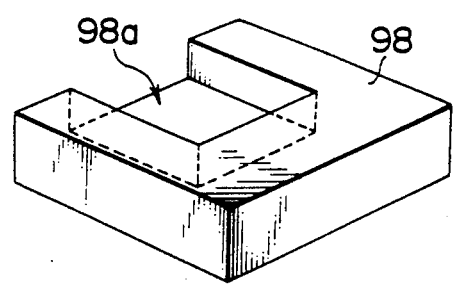
FIGS. 39A and 39B are perspective views illustrating a procedure to construct the other component of the vertical recording magnetic head shown in FIG. 37.
Figure 39B:
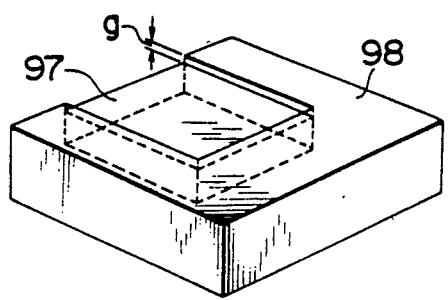
Figure 40:
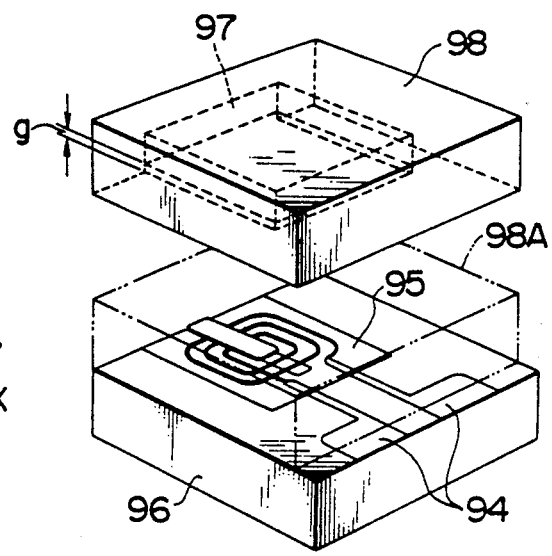
FIG. 40 is a perspective view illustrating a step of fitting the two components together to define a thin-film vertical recording magnetic head.

The magnetic head pattern formed on the upper surface 95a of the substrate 95 remains exposed under this condition, and hence is protected by the protective member 97 formed of a non magnetic material and by the second magnetic substrate 98. The second substrate 98 is formed of a high permeability material such as magnetic ferrite in a manner similar to the first substrate 96, and has a parallelpiped configuration having a length which is slightly less than that of the first magnetic substrate 96, as viewed in the lateral direction in FIG. 39A, and a recess 98a of a comparable size to the recess 96a is formed therein so as to open into two mutually perpendicular surfaces of the magnetic substrate 98. As shown in FIG. 39B, the non-magnetic protective member 97 is fitted into the recess 98a and is integrally secured to the second magnetic substrate 98 as by adhesion. The protective member 97 has a thickness which is less than the depth of the recess 98a, as measured in the direction of the thickness of the second magnetic substrate 98, so that as viewed in FIG. 39B, the top surface of the protective member 97 is slightly recessed relative to the upper surface of the second magnetic substrate 98, defining a step g on the order of several tens of $\mu$m therebetween. The second magnetic substrate 98 having the protective member 97 integrally secured thereto is then vertically inverted or disposed upside down, and is superimposed upon the first magnetic substrate 96 having the substrate 95 integrally secured thereto at a position 98A shown in phantom line in FIG. 40, and the both magnetic substrates 96, 98 are bonded together by the use of an adhesive or glass fusion means. At this time, the protective substrate 97 is located opposite to the substrate 95, but since there is the step g between the surfaces of the protective substrate 97 and the second magnetic substrate 98, the protective substrate 97 is prevented from contacting the magnetic head pattern comprising the main pole 91, the winding conductor 92 and the reflux pole 93 on the substrate 95 when the first magnetic substrate 96 and the second magnetic substrate 98 are bonded together, thus covering and protecting the magnetic head pattern. The head 100 is manufactured as an integral assembly of the two magnetic substrates 96, 98 bonded together. Since the first magnetic substrate 96 has a length which is slightly greater than that of the second magnetic substrate 98, the ends of the leads 94 extending to the rear end of the first magnetic substrate 96 are exposed externally, providing connection terminals.

During a magnetic recording or playback operation which takes place using the magnetic head 100 constructed in the manner mentioned above, the recording medium 4 is run in a direction indicated by an arrow X along the front end face of the head 100. As shown in FIG. 37, a magnetic member 99 is disposed opposite to the front end face of the head 100 with the recording medium 4 interposed therebetween. During a magnetic recording operation, a recording current is passed through the winding conductor 92 through the leads 94, thereby causing the main pole 91 to develop a magnetic field which follows a path 101 including the main pole 91, recording medium 4, reflux pole 93 and returning to the main pole 91. If an external magnetic field, as indicated by a solid arrow Y, is applied to the recording medium 4 in a direction perpendicular thereto either during or subsequent to the magnetic recording, such external field follows paths 102, which are divided when passing through the first magnetic substrate 96 and the second magnetic substrate 98, and after passing through the recording medium 4, they enter the magnetic member 99, from which they are released into the air. Thus, the external field indicated by the paths 102 and the internal field or recording field indicated by the path 101 are completely separated from each other, preventing the external field from influencing the recording field. During a playback operation, a recorded medium produces a magnetic field which defines the same path as occurs during the recording operation. In this manner, a reduction in the recording/playback level attributable to the presence of an external magnetic field as well as a reduction in the recording level of the medium as the magnetic head is brought close to or into sliding contact with the recorded medium can be effectively avoided.

AVAILABILITY IN INDUSTRY

As described, the vertical recording magnetic head of the invention achieves a complete separation between any externally applied magnetic field and a recording or playback magnetic field, thus avoiding a reduction in the recording/playback level attributable to the presence of an external magnetic field as well as a reduction in the recording level of the medium as the magnetic head is brought close to or into sliding contact with a recorded medium.

What is claimed is:

1. A vertical recording magnetic head disposed close to or in sliding engagement with a vertical magnetic recording medium, means for moving said magnetic recording medium and said magnetic head relative to one another, characterized in that the magnetic head includes a main pole, one end of said main pole being positioned in opposing relationship with said magnetic recording medium;

magnetizable shielding means surrounding said magnetic head on all sides except the said one end thereof disposed in opposing relationship to the magnetic medium, said magnetizable shielding means being formed of a magnetizable material having a high permeability and being spaced from said magnetic pole to provide a gap therebetween to shield the magnetic pole from the influence of external magnetic fields;

the magnetic shielding means of high permeability material comprising a first block of high permeability material disposed in opposing relationship with the recording surface of the record medium and in surrounding relationship with the main pole, and a second block of high permeability material disposed in opposing relationship with the first block, with the recording medium interposed therebetween;

means in said gap for maintaining said gap between said first block and said magnetic pole and for joining said magnetic pole and said first block;

said first block being provided with pads disposed on the aforesaid upstream and downstream sides of the sliding surface of the main pole;

said main pole having opposing sides respectively located upstream and downstream relative to the direction of movement of the magnetic medium relative to said main pole; said second block being provided with pads disposed on the aforesaid upstream and downstream sides of the sliding surface of the main pole;

said pads on said first block having sliding surfaces for slidably engaging the surface of said magnetic recording medium opposite the surface of said magnetic recording medium facing said main pole;

said pads on said second block having sliding surfaces for slidably engaging the surface of said magnetic recording medium opposite the surface of said magnetic recording medium facing said main pole;

the pads on said first block being spaced apart a first predetermined distance measured in the direction of movement of said magnetic recording medium;

the pads on said second block being spaced apart a second predetermined distance measured in the direction of movement of said magnetic recording medium;

one of said first and second distances being greater than the remaining one of said first and second distances.

2. A vertical recording magnetic head according to claim 1, wherein the spacing between the pads on said first block is greater than the spacing between the pads on said second block to offset the pads on the first block from the pads on said second block by distances measured in the direction of movement of the magnetic recording medium.

3. The vertical recording magnetic head of claim 1 wherein the pads on said first and second blocks are formed of a soft magnetic material.

4. A vertical recording magnetic head disposed close to or in sliding engagement with a vertical magnetic recording medium, means for moving said magnetic recording medium and said magnetic head relative to one another, characterized in that the magnetic head includes a main pole, one end of said main pole being positioned in opposing relationship with said magnetic recording medium;

magnetic shielding means surrounding said magnetic head on all sides except the said one end thereof disposed in opposing relationship to the magnetic recording medium, said magnetic shielding means being formed of a magnetizable material having a high permeability and being spaced from said magnetic pole to provide a gap therebetween to shield the magnetic pole from the influence of external magentic fields and non-magnetic means for maintaining the gap between said magnetic head and said shielding means and for joining said magnetic head to said shielding means.

5. A vertical recording magnetic head according to claim 4 wherein said shielding means comprises a shielding member having integral pads disposed in opposing relationship to said magnetic recording medium and having surfaces which are adapted for sliding engagement with the magnetic recording medium, said surfaces being substantially coplanar with said one end of said main pole.

6. A vertical recording magnetic head according to claim 5 wherein said pads are formed of a soft magnetic material.

7. A vertical recording magnetic head according to claim 4 in which the pads includes means for removing dust from the surface of the magnetic recording medium as said surface passes said pads and before the portion of the surface from which the dust is removed moves past said magnetic head.

8. A vertical recording magnetic head according to claim 7 in which the sliding surface of the pads comprises a thin layer of dust removing material.

9. A vertical recording magnetic head according to claim 8 in which the thin layer includes at least one of alumina, chromium dioxide and beryllia.

10. A vertical recording magnetic head according to claim 4, further comprising pads on the magnetic shielding means for sliding contact with the magnetic recording medium in order to position a surface of the main pole which is adapted to be brought into sliding contact with the magnetic recording medium in a range which is optimum for a recording/playback operation.

11. A vertical recording magnetic head according to claim 10 in which said pads are disposed at least one the opposite sides of the sliding surface of the main pole as viewed in the direction in which the magnetic recording medium moves relative to the main pole, and pads having a sliding surface for engaging the magnetic recording medium which is elongate in a direction perpendicular to the direction of movement of the magnetic recording medium.

12. A vertical recording magnetic head according to claim 10 in which the pads are formed of an antifriction and abrasion resistant material at least in a region where it is disposed in sliding contact with the magnetic recording medium.

13. A vertical recording magnetic head according to claim 4 in which the magnetic shielding means comprises a block of the high permeability material which is formed with a recess which opens in at least a side that is located opposite to the magnetic recording medium, a main pole block integrally containing the main pole being disposed in the recess.

14. A vertical recording magnetic head according to claim 4 in which the magnetic shielding means comprises a block of high permeability material including a first block of high permeability material disposed in opposing relationship with a recording surface of the magnetic recording medium interposed therebetween.

15. A vertical recording magnetic head according to claim 17 in which the second block is formed with a projection at a location opposite to the main pole which extends close the magnetic recording medium.

16. A vertical recording magnetic head according to claim 14 in which said main pole has opposing sides respectively located upstream and downstream relative to the direction of movement of the magnetic recording medium relative to said main pole; said second block being provided with pads respectively disposed on the aforesaid upstream and downstream sides of the sliding surface of the main pole; said pads on said second block having sliding surfaces for slidably engaging the surface of the magnetic recording medium opposite the surface of said magnetic recording medium facing said main pole.

17. A vertical recording magnetic head according to claim 14 wherein one length of each of the first and second blocks is measured in the direction of movement of said recording medium relative to said magnetic head, said length of said second block being different from the length of said first block.

18. A vertical recording magnetic head according to claim 17 wherein said length of said first block is greater than said length of said second block.

19. A vertical recording magnetic head according to claim 4 in which the main pole is comprised of a magnetic head and a winding cooperating with said magnetic head.

20. A vertical recording magnetic head according to claim 19 wherein said magnetic head is further comprised of a main pole magnetic film arranged between a pair of support members arranged on a magnetic member;

said winding either producing or sensing a magnetic field, which magnetic field extends through said main pole film.

* * * * *

UNITED STATES PATENT AND TRADEMARK OFFICE
CERTIFICATE OF CORRECTION

PATENT NO. : 5,003,423
DATED : March 26, 1991
INVENTOR(S) : Imamura et al.

It is certified that error appears in the above-identified patent and that said Letters Patent is hereby corrected as shown below:

```
Column 1,  line 26, change "products" to --produces--
Column 1,  line 67, change "the" to --then--
Column 4,  line 2,  change "at" to --an--
Column 4,  line 46, change "FIG." to --FIGS.--
Column 7,  line 30, change "8" to --18--
Column 8,  line 11, change "designate" to --designated--
Column 11, line 42, change "increase" to --increased--
Column 12, line 11, change "16" to --16D--
Column 17, line 17, change "to" to --To--
Column 17, line 54, change "ccnstructed" to --constructed--
Column 18, line 21, delete "soft"
Column 22, line 10, after "it" insert --to--
Column 28, line 2,  change "magentic" to --magnetic--
Column 34, line 20, delete "as"
Column 36, line 57, change "15₂" to --15Z₂--
Column 38, line 37, delete "both"
Column 41, line 17, change "one" to --on--
```

Signed and Sealed this

Twentieth Day of April, 1993

*Attest:*

MICHAEL K. KIRK

*Attesting Officer*     Acting Commissioner of Patents and Trademarks